US012784772B2

(12) United States Patent
Tomoda

(10) Patent No.: US 12,784,772 B2
(45) **Date of Patent: *Nov. 3, 2026**

(54) MAGNETIC DISK DEVICE AND WRITE PROCESSING METHOD

(71) Applicants: Kabushiki Kaisha Toshiba, Tokyo (JP); Toshiba Electronic Devices & Storage Corporation, Tokyo (JP)

(72) Inventor: Yusuke Tomoda, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/242,602

(22) Filed: Jun. 18, 2025

(65) Prior Publication Data

US 2026/0290390 A1 Sep. 24, 2026

(30) Foreign Application Priority Data

Mar. 21, 2025 (JP) ................................ 2025-046969

(51) Int. Cl.
*G11B 5/58* (2006.01)
*G11B 5/012* (2006.01)
*G11B 5/00* (2006.01)

(52) U.S. Cl.
CPC ................ *G11B 5/58* (2013.01); *G11B 5/012* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 8,908,310 | B1 | 12/2014 | Bai et al. | |
| 9,412,403 | B1 * | 8/2016 | Dhanda | G11B 20/1217 |
| 9,747,928 | B1 | 8/2017 | Ruan et al. | |
| 10,770,111 | B1 * | 9/2020 | Zayas | G11B 20/1889 |
| 10,984,820 | B2 * | 4/2021 | Isokawa | G11B 5/012 |
| 11,508,409 | B2 * | 11/2022 | Tomoda | G11B 5/012 |
| 11,600,296 | B1 * | 3/2023 | Gao | G11B 20/1217 |
| 12,073,856 | B1 | 8/2024 | Haralson et al. | |
| 12,230,297 | B2 * | 2/2025 | Maeto | G11B 5/5556 |
| 12,236,985 | B1 * | 2/2025 | Tomoda | G11B 5/012 |
| 12,387,757 | B1 * | 8/2025 | Takaesu | G11B 5/012 |
| 12,394,449 | B1 * | 8/2025 | Tanabe | G11B 27/36 |
| 12,548,592 | B2 * | 2/2026 | Tomoda | G11B 5/5539 |
| 2024/0177735 | A1 | 5/2024 | Knigge et al. | |
| 2024/0304212 | A1 * | 9/2024 | Gao | G11B 5/02 |

* cited by examiner

*Primary Examiner* — Fred Tzeng
(74) *Attorney, Agent, or Firm* — Kim & Stewart LLP

(57) ABSTRACT

According to one embodiment, a magnetic disk device includes a disk, a write head which is a heat assisted magnetic recording head, a write processing unit which selects shingled magnetic recording and which urges the write head to execute writing data to each of the bands, and an adjustment unit. When the write processing unit urges the write head to execute writing the data to the first band, the adjustment unit arranges one or more unused sectors among the plurality of unused sectors, in the tracks other than a last track where the data is last written. The plurality of data sectors of the first band include a plurality of recording sectors, and a plurality of unused sectors.

20 Claims, 16 Drawing Sheets

MAGNETIC DISK DEVICE AND WRITE PROCESSING METHOD

CROSS-REFERENCE TO RELATED APPLICATIONS

This application is based upon and claims the benefit of priority from Japanese Patent Application No. 2025-046969, filed Mar. 21, 2025, the entire contents of which are incorporated herein by reference.

FIELD

Embodiments described herein relate generally to a magnetic disk device and a write processing method.

BACKGROUND

Magnetic disk devices such as Conventional Magnetic Recording (CMR) (or conventional recording) magnetic disk devices that write data to a plurality of tracks at intervals in the radial direction of the disk, Shingled Magnetic Recording (SMR) magnetic disk devices that overwrite data to a plurality of tracks in the radial direction of the disk, and hybrid recording type magnetic disk devices that selectively execute the conventional magnetic recording and the shingled magnetic recording, are known.

SUMMARY

In general, according to one embodiment, there is provided a magnetic disk device including a disk having a plurality of bands each including a plurality of tracks in a recording layer, the plurality of bands including a first band, each of the tracks including a plurality of data sectors, a write head writing data to the recording layer, the write head being a heat assisted magnetic recording head, a write processing unit which selects shingled magnetic recording of overwriting data to the plurality of tracks in an overwrite direction parallel to a radial direction of the disk and which urges the write head to execute writing data to each of the bands, and an adjustment unit. When the write processing unit urges the write head to execute writing the data to the first band, the adjustment unit arranges one or more unused sectors among a plurality of unused sectors, in the tracks other than a last track where the data is last written. The plurality of data sectors of the first band include a plurality of recording sectors where valid data is written, and the plurality of unused sectors that are data sectors other than the plurality of recording sectors and where the valid data is not written.

According to another embodiment, there is provided a write processing method which is applied to a magnetic disk device including a disk having a plurality of bands each including a plurality of tracks in a recording layer, the plurality of bands including a first band, each of the tracks including a plurality of data sectors, a write head writing data to the recording layer, the write head being a heat assisted magnetic recording head, a write processing unit which selects shingled magnetic recording of overwriting data to the plurality of tracks in an overwrite direction parallel to a radial direction of the disk and which urges the write head to execute writing data to each of the bands, and an adjustment unit. The write processing method comprises, when the write processing unit urges the write head to execute writing the data to the first band, arranging one or more unused sectors among a plurality of unused sectors in the tracks other than a last track where the data is last written. The plurality of data sectors of the first band include a plurality of recording sectors where valid data is written, and the plurality of unused sectors that are data sectors other than the plurality of recording sectors and where the valid data is not written.

DETAILED DESCRIPTION

Embodiment

Figure 1:
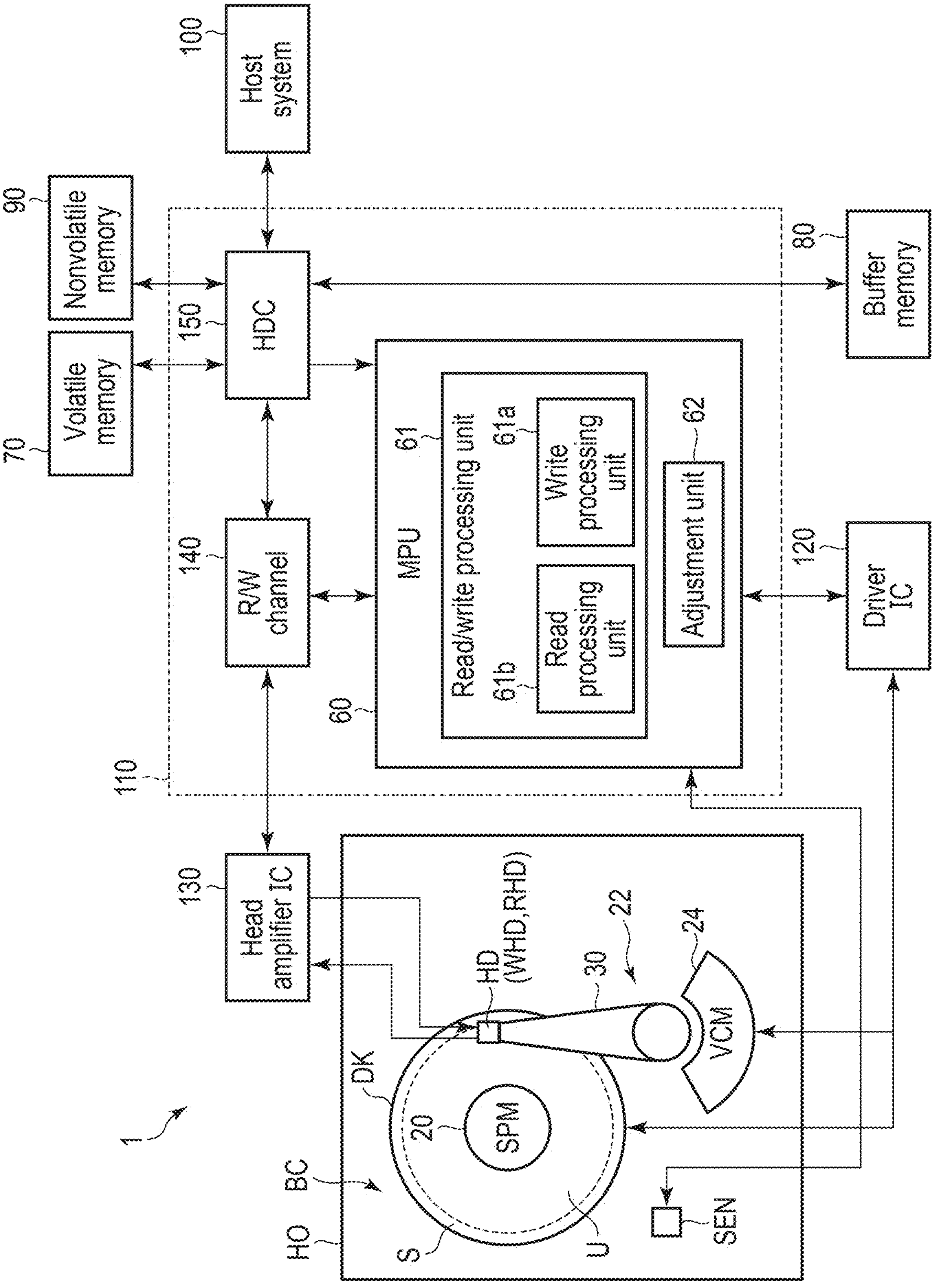
FIG. 1 is a block diagram showing a configuration of a magnetic disk device according to an embodiment.

A magnetic disk device 1 according to an embodiment and a write processing method applied to the magnetic disk device 1 will be described hereinafter with reference to the accompanying drawings. First, a configuration of the magnetic disk device 1 will be described. FIG. 1 is a block diagram showing a configuration of the magnetic disk device 1 according to the embodiment. In the present embodiment, the magnetic disk device 1 is a hybrid recording magnetic disk device that selectively executes the conventional magnetic recording and the shingled magnetic recording. However, a technology to be described below may be applied to a magnetic disk device of the shingled magnetic recording.

As shown in FIG. 1, the magnetic disk device 1 comprises a plurality of, for example, one to elven disks (magnetic disks) DK serving as recording media, a spindle motor (SPM) 20 serving as a drive motor, a head stack assembly 22, a driver IC 120, a head amplifier integrated circuit (hereinafter referred to as a head amplifier IC or preamplifier) 130, a volatile memory 70, a buffer memory (buffer) 80, a nonvolatile memory 90, and a system controller 110 that is a single-chip integrated circuit. In addition, the magnetic disk device 1 is connected to a host system (hereinafter simply referred to as a host) 100.

Each of the disks DK is formed to have a diameter of, for example, 97 mm (3.8 inches) and has recording layers (magnetic recording layers) on both sides. Incidentally, in the embodiment, the magnetic disk device 1 comprises one to eleven disks DK. However, the number of disks DK is not limited to these.

The head stack assembly 22 can control a head HD mounted on an arm 30 to move, i.e., seek to a target position on the disk DK by driving a voice coil motor (hereinafter referred to as VCM) 24.

A user data area U that can be used for the user, and a system area S where information necessary for the system management is written are assigned to the area of the disk DK where the data can be written.

The head HD records and reproduces information on the disk DK. The head HD comprises a slider as a main body, and comprises a write head WHD, a read head RHD, and the like that are mounted on the slider. The write head WHD writes the data to the recording layer of the disk DK. The read head RHD reads the data from data tracks of the recording layer of the disk DK.

The "central part of the head WHD" may be referred to as the "head HD", the "central part of the write head WHD" may be referred to as the "write head WHD", and the "central part of the read head RHD" may be referred to as the "read head RHD". The "central part of the write head WHD" may be referred to simply as the "head HD", and the "central part of the read head RHD" may be referred to simply as the "head HD".

The driver IC 120 controls driving the SPM 20 and the VCM 24 under control of the system controller 110 (more specifically, MPU 60 to be described later). The SPM 20 supports and rotates a plurality of disks DK.

The disk DK, the SPM 20, and the head stack assembly 22 are accommodated in a housing HO, and are supported by a base BC of the housing HO. Furthermore, a sensor SEN is accommodated in a housing HO, and the sensor SEN is supported by a base BC. The sensor SEN is, for example, a temperature sensor, which is accommodated in the housing HO and can detect ambient temperature information in the housing HO. The sensor SEN may detect the temperature information of the atmosphere in which the head HD is provided and temperature information of the head HD. When the sensor SEN detects the temperature information of the head HD, the sensor SEN is not supported by the base BC and is mounted on, for example, a slider together with the head HD, which will be described later.

The head amplifier IC 130 comprises a read amplifier and a write driver. The read amplifier amplifies a read signal read from the disk DK and outputs the amplified read signal to the system controller 110 (more specifically, a read/write (R/W) channel 140 to be described later). The write driver outputs a write current corresponding to a signal output from the R/W channel 140 to the head HD.

The volatile memory 70 is a semiconductor memory where the stored data is lost when power supply is cut off. The volatile memory 70 stores data and the like necessary for processing in each of units of the magnetic disk device 1. The volatile memory 70 is a random access memory (RAM). The volatile memory 70 is, for example, a dynamic random access memory (DRAM). However, the volatile memory 70 may be a synchronous dynamic random access memory (SDRAM).

The buffer memory 80 is a semiconductor memory which temporarily records data and the like transmitted and received between the magnetic disk device 1 and the host 100. Incidentally, the buffer memory 80 may be formed integrally with the volatile memory 70. The buffer memory 80 is a volatile RAM. Examples of the buffer memory 90 are a DRAM, a static random access memory (SRAM), an SDRAM, a ferroelectric random access memory (FeRAM), a magnetoresistive random access memory (MRAM), and the like.

The buffer memory 80 includes areas used as a read cache and a write cache, and temporarily stores commands and the like, which are received from the host 100.

The nonvolatile memory 90 is a semiconductor memory which records data stored even when power supply is cut off. The nonvolatile memory 90 is, for example, a NAND flash read only memory (FROM). However, the nonvolatile memory 90 may also be a NOR FROM.

The system controller (controller) 110 is realized by, for example, using a large scale integrated circuit (LSI) referred to as a system-on-a-chip (SoC) in which a plurality of elements are integrated on a single chip. The system controller 110 includes a read/write (R/W) channel 140, a hard disk controller (HDC) 150, and a microprocessor (MPU) 60. The system controller 110 is electrically connected to the driver IC 120, the head amplifier IC 130, the volatile memory 70, the buffer memory 80, the nonvolatile memory 90, a sensor SEN, and the host 100.

The R/W channel 140 executes signal processing of read data transferred from the disk DK to the host 100 and write data transferred from the host 100 in accordance with instructions from the MPU 60 to be described later. The R/W channel 140 comprises a circuit or function of modulating the write data. In addition, the R/W channel 140 comprises a circuit or a function of measuring the signal quality of the read data. The R/W channel 140 is electrically connected to, for example, the head amplifier IC 130, the HDC 150, the MPU 60 and the like.

The HDC 150 controls data transfer between the host 100 and the R/W channel 140 in response to an instruction from the MPU 60 to be described later. The HDC 150 is electrically connected to, for example, the R/W channel 140, the MPU 60, the volatile memory 70, the buffer memory 80, the nonvolatile memory 90, and the like.

The HDC 150 includes a gate generation unit. In accordance with the commands from the host 100, instructions from the MPU 60, and the like, the gate generation unit generates various gates, for example, a write gate, a read gate, a servo gate, and the like and outputs the gates to the R/W channel 140, for example, the gate detection unit. In the following descriptions, "activating a predetermined gate" may be referred to as "asserting a predetermined gate". In addition, "falling down a predetermined gate" may be referred to as "negating the predetermined gate". In addition, "asserting a predetermined gate" and "negating a predetermined gate" may imply the meaning "generating a predetermined gate". Incidentally, the gate generation unit may be included in the R/W channel 140 or the MPU 60.

The R/W channel 140 includes a gate detection unit. The gate detection unit detects whether various gates, for example, the write gate, the read gate, the servo gate, and the like are in an asserted state or a negated state.

For example, the gate detection unit executes the write processing when detecting that the write gate is asserted, and suspends (stops) the write processing when detecting that the write gate is negated.

In addition, the gate detection unit executes the read processing when detecting that the read gate is asserted, and stops the read processing when detecting that the read gate is negated. The gate detection unit executes the servo read processing when detecting that the servo gate is asserted, and stops the servo read processing when detecting that the servo gate is negated. Incidentally, the gate detection unit may be provided inside the HDC 150 or the MPU 60.

The MPU 60 is a control unit or main controller which controls each of units of the magnetic disk device 1. The MPU 60 controls the VCM 24 via the driver IC 120 to execute servo control for positioning the head HD. The MPU 60 controls the operation of writing the data to the disk DK and selects a storage destination of the write data transferred from the host 100. In addition, the MPU 60 controls the operation of reading the data from the disk DK and controls the processing of the read data transferred from the disk DK to the host 100. The MPU 60 is connected to each unit of the magnetic disk device 1. The MPU 60 is electrically connected to, for example, the driver IC 120, the R/W channel 140, the HDC 150, the sensor SEN, and the like.

The MPU 60 comprises a read/write processing unit 61, an adjustment unit 62, and the like. The MPU 60 executes on firmware the processing of these units, for example, the read/write processing unit 61, the adjustment unit 62, and the like. Incidentally, the MPU 60 may comprise each of these units as a circuit.

The read/write processing unit 61 includes a write processing unit 61*a* and a read processing unit 61*b*. According to the write commands from the host 100, the write processing unit 61*a* controls the data write processing and can execute the write processing to cause the write head WHD to write the data to the recording layer of the disk DK. According to the read commands from the host 100, the read processing unit 61*b* controls the data read processing and can execute the read processing to cause the read head RHD to read the data from the recording layer of the disk DK. The read/write processing unit 61 controls the VCM 24 via the driver IC 120, positions the head HD at a target position (predetermined radial position) on the disk DK, and executes the read processing or the write processing.

Incidentally, details of operations of the adjustment unit 62 will be described later.

Figure 2:
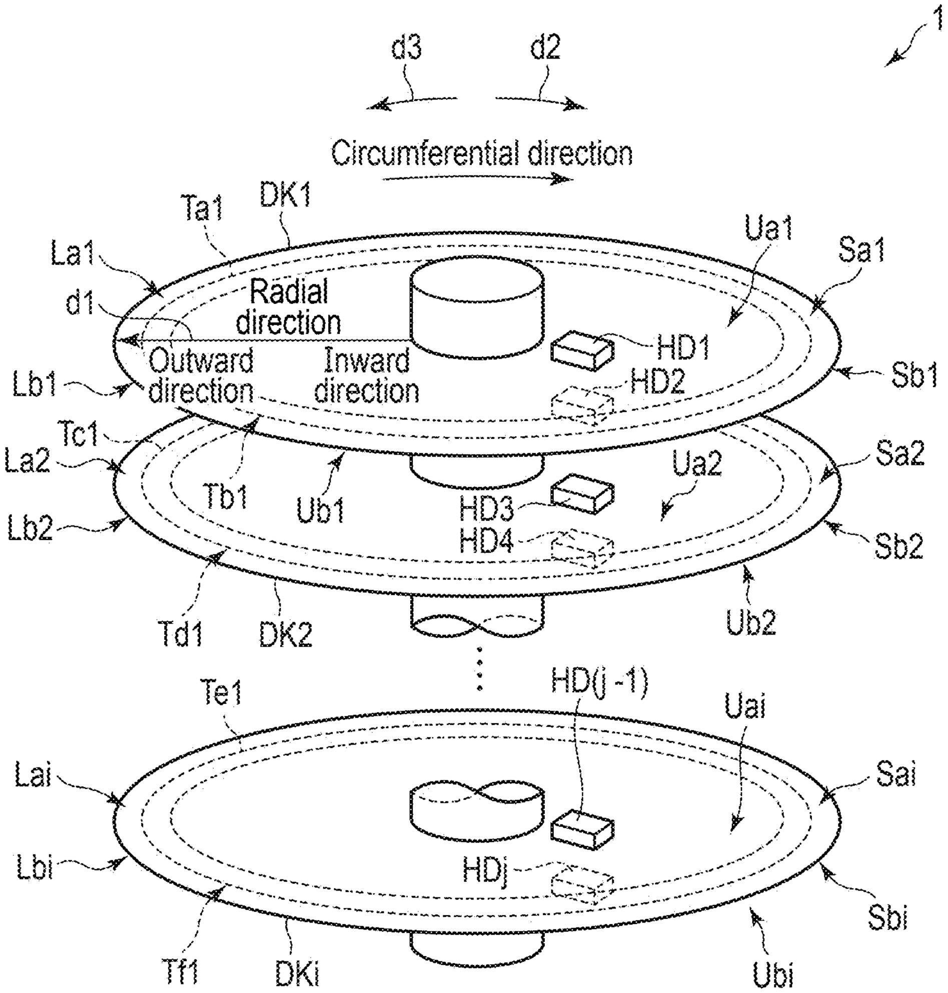
FIG. 2 is a perspective view showing parts of the magnetic disk device, illustrating a plurality of disks and a plurality of heads.

FIG. 2 is a perspective view showing parts of the magnetic disk device 1, illustrating a plurality of disks DK and a plurality of heads HD.

As shown in FIG. 2, the rotation of direction of the disks DK in the circumferential direction is referred to as a rotational direction d3.

Incidentally, in the example shown in FIG. 2, the rotational direction d3 is illustrated as a counterclockwise direction, but may be an opposite (clockwise) direction. In addition, a traveling direction d2 of the heads HD relative to the disks DK is opposite to the rotational direction d3. The traveling direction d2 is the direction in which the heads HD sequentially write the data to and read data from the disks DK in the circumferential direction, i.e., the direction in which the heads HD travel with respect to the disks DK in the circumferential direction.

The magnetic disk device 1 comprises i disks, from disk DK1 through disk DKi, and j heads, from head HD1 through head HDj. In the present embodiment, the number of heads HD is twice the number of disks DK (j=2×i).

The disks DK1 through DKi are provided coaxially to be spaced apart from each other at intervals and overlap with each other. The diameters of the disks DK1 to DKi are the same as each other. The terms "same", "identical", "matching", "equivalent" and the like imply not only the meaning of being exactly the same, but also the meaning of being different to the extent that they can be regarded as substantially the same. Incidentally, the diameters of the disks DK1 to DKi may be different from each other.

Each of the disks DK has recording layers L on both sides. For example, the disk DK1 has a first recording layer La1 and a second recording layer Lb1 on the side opposite to the first recording layer La1. The disk DK2 has a first recording layer La2 and a second recording layer Lb2 on the side opposite to the first recording layer La2. The disk DKi has a first recording layer Lai and a second recording layer Lbi on the side opposite to the first recording layer Lai. Each first recording layer La may be referred to as a front surface or a recording surface. Each second recording layer Lb may be referred to as a back surface or a recording surface.

However, each first recording layer La may be referred to as a back surface. In this case, each second recording layer Lb may be referred to as a front surface.

Each of the recording layers L includes a user data area U and a system area S. The first recording layer La1 includes a user data area Ua1 and a system area Sa1. The second recording layer Lb1 includes a user data area Ub1 and a system area Sb1. The first recording layer La2 includes a user data area Ua2 and a system area Sa2. The second recording layer Lb2 includes a user data area Ub2 and a system area Sb2. The first recording layer Lai includes a user data area Uai and a system area Sai. The second recording layer Lbi includes a user data area Ubi and a system area Sbi.

A track sandwiched between double broken lines in the figure, of the user data area Ua1 (first recording layer La1), is referred to as track Ta1. A track located on a side opposite to the track Ta1, of the user data area Ub1 (second recording layer Lb1), is referred to as track Tb1.

A track sandwiched between double broken lines in the figure, of the user data area Ua2 (first recording layer La2), is referred to as track Tc1. A track located on a side opposite to the track Tc1, of the user data area Ub2 (second recording layer Lb2), is referred to as track Td1.

A track sandwiched between double broken lines in the figure, of the user data area Uai (first recording layer Lai), is referred to as track Te1. A track located on a side opposite to the track Te1, of the user data area Ubi (second recording layer Lbi), is referred to as track Tf1.

In the present embodiment, the tracks Ta1, Tb1, Tc1, Td1, Te1, and Tf1 are located on the same cylinder.

The heads HD face the disks DK. In the present embodiment, one head HD faces each of the recording layers L of the disk DK. For example, the head HD1 faces the first recording layer La1 of the disk DK1, writes the data to the first recording layer La1, and reads the data from the first recording layer La1. The head HD2 faces the second recording layer Lb1 of the disk DK1, writes the data to the second recording layer Lb1, and reads the data from the second recording layer Lb1.

The head HD3 faces the first recording layer La2 of the disk DK2, writes the data to the first recording layer La2, and reads the data from the first recording layer La2. The head HD4 faces the second recording layer Lb2 of the disk DK2, writes the data to the second recording layer Lb2, and reads the data from the second recording layer Lb2. The head HDj-1 faces the first recording layer Lai of the disk DKi, writes the data to the first recording layer Lai, and reads the data from the first recording layer Lai. The head HDj faces the second recording layer Lbi of the disk DKi, writes the data to the second recording layer Lbi, and reads the data from the second recording layer Lbi.

Figure 3:
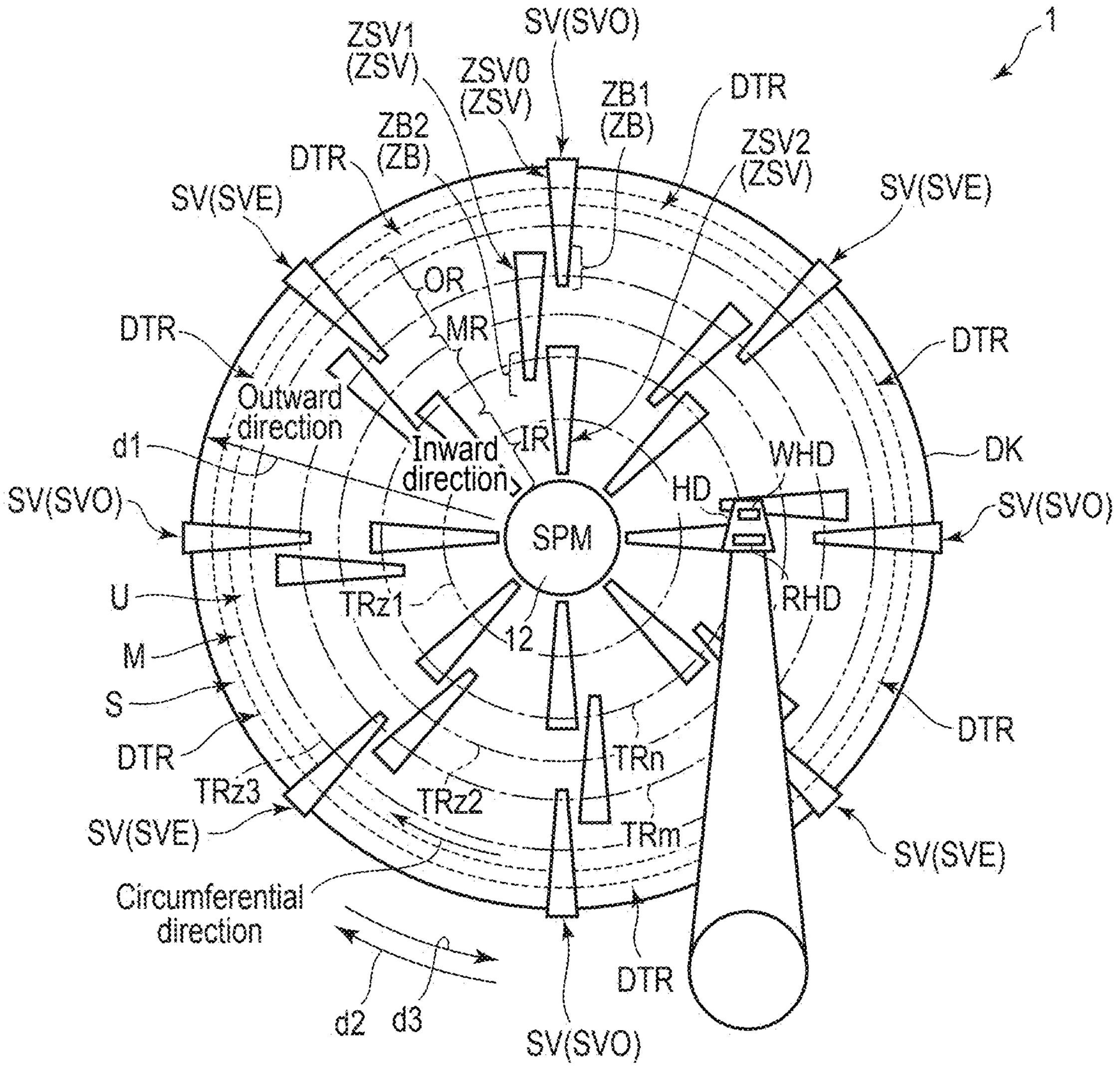
FIG. 3 is a schematic diagram showing an example of arrangement of a plurality of servo areas and a plurality of data areas on a single disk according to the embodiment.

FIG. 3 is a schematic diagram showing an example of arrangement of a plurality of servo areas SV and a plurality of data areas DTR on the single disk DK according to the embodiment. As shown in FIG. 3, a direction toward the outer circumference of the disk DK in the radial direction d1 of the disk DK is referred to as an outward direction (outside), and a direction opposite to the outward direction is referred to as an inward direction (inside).

In FIG. 3, the user data area U is divided into an inner circumferential area IR located in the inward direction, an outer circumferential area OR located in the outward direction, and an intermediate circumferential area MR located between the inner circumferential area IR and the outer circumferential area OR.

The disk DK includes a plurality of servo areas SV and a plurality of data areas DTR. For example, the plurality of servo areas SV may extend radially in the radial direction of the disk DK and may be discretely arranged at predetermined intervals in the circumferential direction. For example, the plurality of servo areas SV may extend linearly from the inner circumference to the outer circumference and may be discretely arranged at predetermined intervals in the circumferential direction. For example, the plurality of servo areas SV may extend in a spiral shape from the inner circumference to the outer circumference and may be discretely arranged at predetermined intervals in the circumferential direction. Alternatively, for example, the plurality of servo areas SV may be arranged in a form of islands in the radial direction and may be discretely arranged at different predetermined intervals in the circumferential direction.

In the following descriptions, one servo area SV in a predetermined track may also be referred to as a "servo sector". Incidentally, the "servo area SV" may also be referred to as a "servo sector SV". The servo sector includes servo data. The "arrangement and the like of several servo data elements constituting the servo sector" may be hereinafter referred to as a "servo pattern". Incidentally, the "servo data written to the servo sector" may also be referred to as a "servo sector".

Each of a plurality of data areas DTR is arranged between a plurality of servo areas SV. For example, the data area DTR corresponds to the area between two continuous servo areas SV in the circumferential direction. One servo area SV on a predetermined track may also be hereinafter referred to as the "data sector". Incidentally, the "data area DTR" may also be referred to as a "data sector DTR". The data sector includes user data. Incidentally, the "user data written to the data sector" may also be referred to as the "data sector". The "data sector" may also be referred to as the "user data". In addition, "a pattern composed of several data elements" may also be referred to as a "data pattern". In the example shown in FIG. 3, the data pattern on a predetermined track is composed of a plurality of servo data elements (servo sectors) and a plurality of user data elements (data sectors).

The servo area SV includes a plurality of zone servo areas ZSV and the like. Incidentally, in addition to the zone servo areas ZSV, the servo area SV may include an area including a gap (i.e., displacement of circumferential positions of two zone servo areas), an area including the servo data, the data area DTR, and the like. The plurality of zone servo areas ZSV are discretely arranged in the radial direction d1. Each of the plurality of zone servo areas ZSV extends in the radial direction d1.

One zone servo area (servo area) ZSV in a predetermined track may also be referred to as a "zone servo sector" or a "servo sector". Incidentally, the "zone servo area (servo area) ZSV" may also be referred to as a "zone servo sector ZSV" or a "servo sector ZSV". The "servo data written in the zone servo sector" may also be referred to as a "zone servo sector". The "arrangement of several servo data elements constituting the zone servo sector" may also be referred to as a "zone servo pattern" or a "servo pattern". One servo area SV in a predetermined track may also be hereinafter referred to as a "zone pattern sector".

Incidentally, the "servo area SV" may also be referred to as the "zone pattern sector". The "at least one data element and the like written to the zone pattern sector" may also be referred to as the "zone pattern sector". The zone pattern sector includes at least one zone servo sector. The "data pattern of the zone pattern sector" may also be hereinafter referred to as a "zone data pattern".

In the example shown in FIG. 3, the servo areas SV include zone servo areas ZSV0, ZSV1, and ZSV2. The zone servo areas ZSV0, ZSV1, and ZSV2 are arranged in a staggered pattern in the radial direction. The zone servo areas ZSV0, ZSV1, and ZSV2 may also be arranged in a staircase pattern in the radial direction.

The zone servo area ZSV2 is located on an inner circumferential side than the zone servo area ZSV1. The zone servo area ZSV0 is located on an outer circumferential side than the zone servo area ZSV1. For example, the zone servo area ZSV2 is arranged from the inner circumferential area IR to the middle circumferential area MR, the zone servo area ZSV1 is arranged from the inner circumferential area IR to the outer circumferential area OR, and the zone servo area ZSV0 is arranged from the middle circumferential area MR to the outer circumferential area OR. In the following descriptions, a predetermined radial area in which the plurality of zone servo areas ZSV are arranged in the circumferential direction, in a predetermined servo area SV, may also be referred to as a zone servo boundary area, a double servo area, or a double zone servo area ZB.

In the example shown in FIG. 3, the main servo areas SVO and the sub-servo areas SVE are alternately arranged at intervals in the circumferential direction. For example, one sub-servo area SVE is arranged between two main servo areas SVO that are continuously aligned at an interval in the circumferential direction. In other words, one sub-servo area SVE is arranged between two main servo areas SVO that are continuously aligned at an interval in the circumferential direction. For example, when sequentially continuous numbers are assigned to all the servo areas SV of the disk DK, the main servo areas SVO correspond to the odd-numbered servo areas SV, and the sub-servo areas SVE correspond to the even-numbered servo areas SVO. Incidentally, two or more sub-servo areas SVE may be arranged between two main servo areas SVO that are continuously arranged at an interval, in the circumferential direction.

The main servo areas SVO and the sub-servo areas SVE may be composed of, for example, only servo areas that read and demodulate the servo data as a whole (hereinafter often referred to as normal servo areas). In the following descriptions, "reading and demodulating the servo data" may also be referred to as "servo-reading". The main servo areas SVO and the sub-servo areas SVE may also be composed of, for example, the normal servo areas, and servo areas (hereinafter often referred to as short servo areas) where servo-reading is executed in a smaller circumferential range of the servo data than a circumferential range of the servo data where servo-reading is executed in the normal servo areas.

A media cache M is allocated to the disk DK. However, the media cache M may not be arranged on the disk DK.

By reading the plurality of servo data elements described above with the read head RHD, for example, the positioning error of the head HD (for example, the write head WHD) can be derived and the movement of the head HD to a target position on the disk DK can be controlled.

In the embodiment, the example in which the number of zones of the disk DK is three has been described, but the number of zones of the disk DK can be variously changed. The number of zones of the disk DK may be thirty to forty. In addition, each of the zones includes a plurality of bands. For example, each of the zones includes several hundreds of bands.

Figure 4:
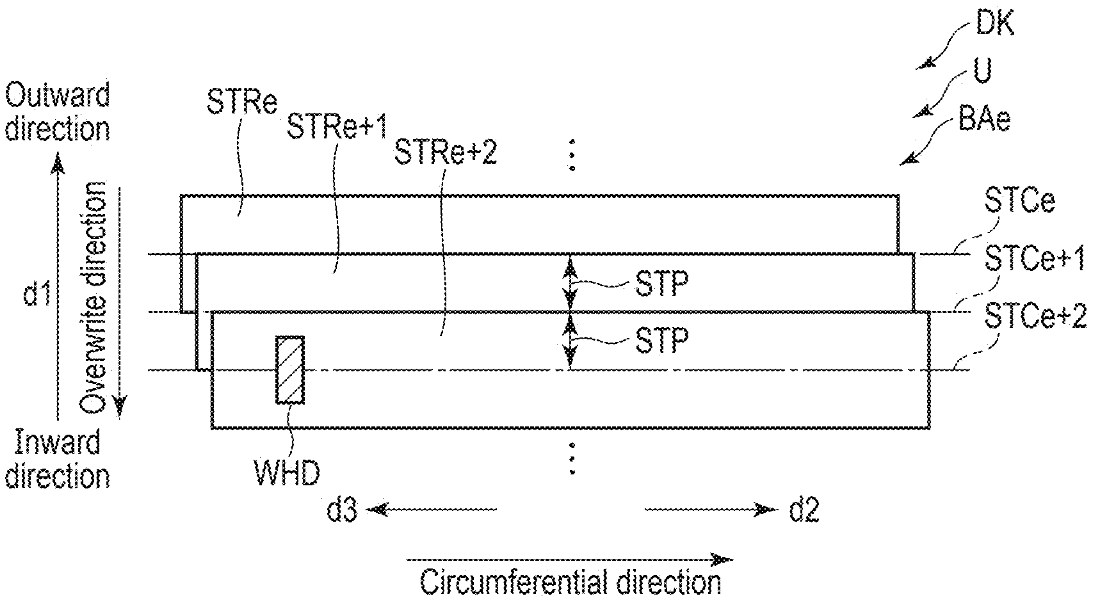
FIG. 4 is a schematic diagram showing three tracks in the user data area where shingled magnetic recording processing of the disk shown in FIG. 3 is executed, and a write head.

FIG. 4 is a schematic diagram showing three tracks STR of a user data area U where shingled magnetic recording of the disk DK shown in FIG. 3 is executed, and a write head WHD. The user data area U is a shingled magnetic recording area. Sequentially writing the data in band units within the user data area U is permitted, i.e., shingled magnetic recording is permitted.

As shown in FIG. 4, the write head WHD can sequentially write the data to the disk DK in the traveling direction d2. The read head RHD shown in FIG. 3 can also sequentially read the data written to the disk DK in the traveling direction d2.

In the direction parallel to the radial direction d1, the direction of sequentially executing the shingled magnetic recording for a plurality of tracks STR that are a plurality of data tracks, i.e., the direction of making a track STR to which the data is be next written overlap with a track STR to which the data has been previously written, in the radial direction d1, is referred to as an overwrite direction or a recording progress direction. In a band BAe shown in FIG. 4, an overwrite direction is an inward direction, but the overwrite direction may be an outward direction.

For example, the overwrite direction applied to a plurality of bands BA (a plurality of zones Z) located on an outer circumference side relative to a specific radial position and an overwrite direction applied to a plurality of bands BA (a plurality of zones Z) located on an inner circumferential side relative to the specific radial position may be opposite to each other.

The band BAe includes a plurality of tracks STR including tracks STRe, STRe+1, and STRe+2. The tracks STRe, STRe+1, and STRe+2 are sequentially overwritten in the overwrite direction in the order of these tracks. The track STRe among the tracks STRe, STRe+1, and STRe+2 corresponds to the track where data is first written, and the track STRe+2 corresponds to the track where data is last written.

The track STRe has a track center STCe in the center of the radial direction d1 when data is not overwritten to the other track. The track STRe+1 has a track center STCe+1 in the center of the radial direction d1 when data is not overwritten to the other track. The track STRe+2 has a track center STCe+2 in the center of the radial direction d1 when data is not overwritten to the other track.

In the example shown in FIG. 4, the data is written to the tracks STRe, STRe+1, and STRe+2 at a pitch (shingled magnetic recording track pitch) STP. The track center STCe of the track STRe and the track center STCe+1 of the track STRe+1 are separated from each other at the pitch STP in the radial direction d1. The track center STCe+1 of the track STRe+1 and the track center STCe+2 of the track STRe+2 are separated from each other at the pitch STP in the radial direction d1. The data may be written to the tracks STRe to STRe+2 at different pitches.

A width in the radial direction d1 of the area where data is not overwritten to the track STRe+1, of the track STRe, is the same as a width in the radial direction d1 of the area where data is not overwritten to the track STRe+2, of the track STRe+1. Incidentally, the width in the radial direction d1 of the area where data is not overwritten to the track STRe+1, of the track STRe, may be different from the width in the radial direction d1 of the area where is data not overwritten to the track STRe+2, of the track STRe+1.

In FIG. 4, each track STR has a rectangular shape for convenience of descriptions. In reality, however, each track STR is curved along the circumferential direction. In addition, each track STR may have a wave shape extending in the circumferential direction while varying in the radial direction d1. Incidentally, data is overwritten to three tracks STR in FIG. 4, but may be overwritten to more than three tracks STR.

In addition, the data may be overwritten to two tracks STR during a write period before interrupting the sequential write to the band BAe or a period after elapse of time since interruption of the sequential write to the band BAe and after resuming the sequential write to the band BAe.

The write processing unit 61*a* can select the shingled magnetic recording of overwriting the data to the plurality of tracks STR in the overwrite direction and urge the write head WHD to write the data to each of the bands BA. In the example shown in FIG. 4, the write processing unit 61*a* sequentially executes the shingled magnetic recording for the tracks STRe to STRe+2 in the band BAe at the pitch STP in the inward direction (overwrite direction). Since the user data area U is the area where the data is written in the shingled magnetic recording, the recording density of the user data area U can be improved.

The write processing unit 61*a* writes the data to the track STRe+1 at the pitch STP in the inward direction of the track STRe and overwrites data to the track STRe+1 and an inner circumferential part of the track STRe. The write processing unit 61*a* writes the data to the track STRe+2 at the pitch STP in the inward direction of the track STRe+1 and overwrites data to the track STRe+2 and an inner circumferential part of the track STRe+1.

Figure 5:
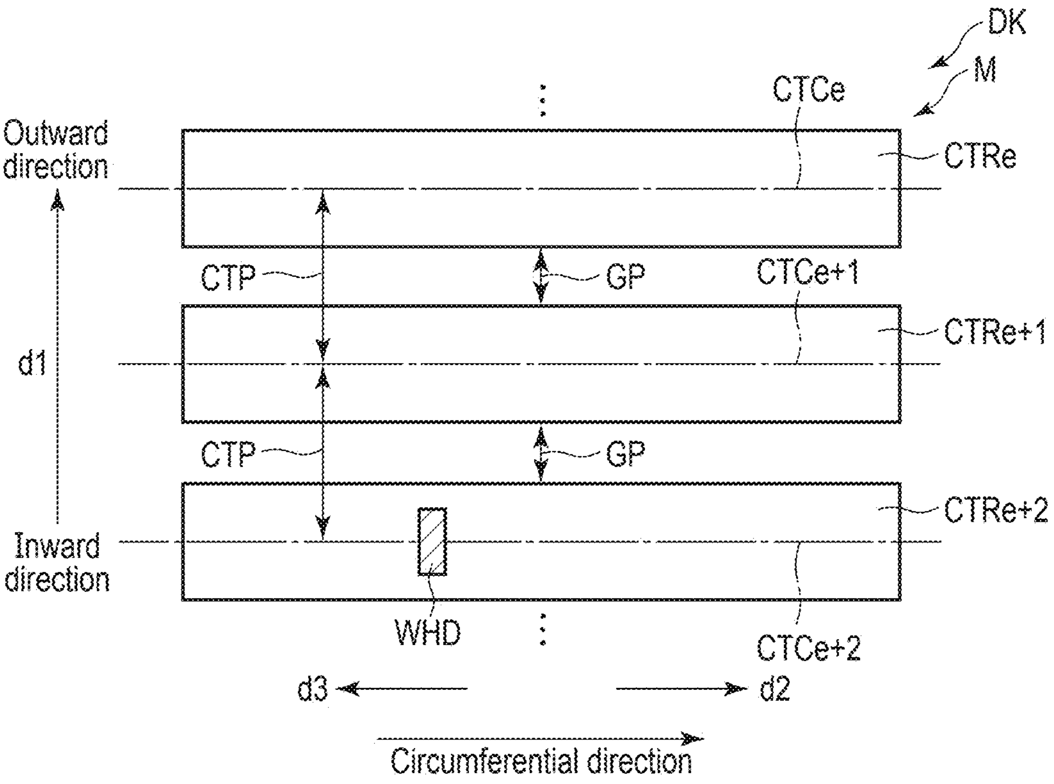
FIG. 5 is a schematic diagram showing three tracks of a media cache where conventional magnetic recording processing of the disk shown in FIG. 3 is executed, and a write head.

FIG. 5 is a schematic diagram showing three tracks CTR of a media cache M where conventional magnetic recording of the disk DK shown in FIG. 3 is executed, and a write head WHD. The media cache M and the system area S shown in FIG. 3 are the conventional magnetic recording areas. In the media cache M and the system area S, randomly writing the data is permitted, i.e., conventional magnetic recording is permitted.

As shown in FIG. 5, the media cache M includes a plurality of tracks CTR including tracks CTRe, CTRe+1, and CTRe+2. For example, widths (track widths) in the radial direction d1 of the tracks CTRe, CTRe+1, and CTRe+2 are the same as each other. Incidentally, the track widths of the tracks CTRe to CTRe+2 may be different from each other.

The track CTRe has a track center CTCe in the center of the radial direction d1, the track CTRe+1 has a track center CTCe+1 in the center of the radial direction d1, and the track CTRe+2 has a track center CTCe+2 in the center of the radial direction d1. In the example shown in FIG. 4, the data is written to the tracks CTRe, CTRe+1, and CTRe+2 at the pitch (conventional magnetic recording track pitch) CTP. The track center CTCe of the track CTRe and the track center CTCe+1 of the track CTRe+1 are separated from each other at the pitch CTP. The track center CTCe+1 of the track CTRe+1 and the track center CTCe+2 of the track CTRe+2 are separated from each other at the pitch CTP.

The track CTRe and the track CTRe+1 are separated from each other at a gap GP. The track CTRe+1 and the track CTRe+2 are separated from each other at the gap GP. Incidentally, the data may be written to the tracks CTRe to CTRe+2 at different pitches. In FIG. 5, each track CTR has a rectangular shape for convenience of descriptions. In reality, however, each track CTR is curved along the circumferential direction. In addition, each track CTR may have a wave shape extending in the circumferential direction while varying in the radial direction d1.

The write processing unit 61*a* can execute the write processing by selecting the conventional magnetic recording of writing the data to the plurality of tracks CTR spaced apart in the radial direction d1 of the disk DK. In the example shown in FIG. 5, the write processing unit 61*a* positions the write head WHD to the track center CTCe in a predetermined area of the disk DK and executes the conventional magnetic recording for the track CTRe or a predetermined sector of the track CTRe.

The write processing unit 61*a* positions the write head WHD to the track center CTCe+1, which is separated from the track center CTCe of the track CTRe in the inner direction at the pitch CTP, and executes the conventional magnetic recording for the track CTRe+1 or a predetermined sector of the track CTRe+1. The write processing unit 61*a* positions the write head WHD to the track center CTCe+2, which is separated from the track center CTCe+1 of the track CTRe+1 in the inner direction at the pitch CTP, and executes the conventional magnetic recording for the track CTRe+2 or a predetermined sector of the track CTRe+2.

The write processing unit 61*a* may sequentially execute the conventional magnetic recording for the tracks CTRe, CTRe+1, and CTRe+2, in a predetermined area of the disk DK, or randomly execute the conventional magnetic recording for a predetermined sector of the track CTRe, a predetermined sector of the track CTRe+1, and a predetermined sector of the track CTRe+2.

Figure 6:
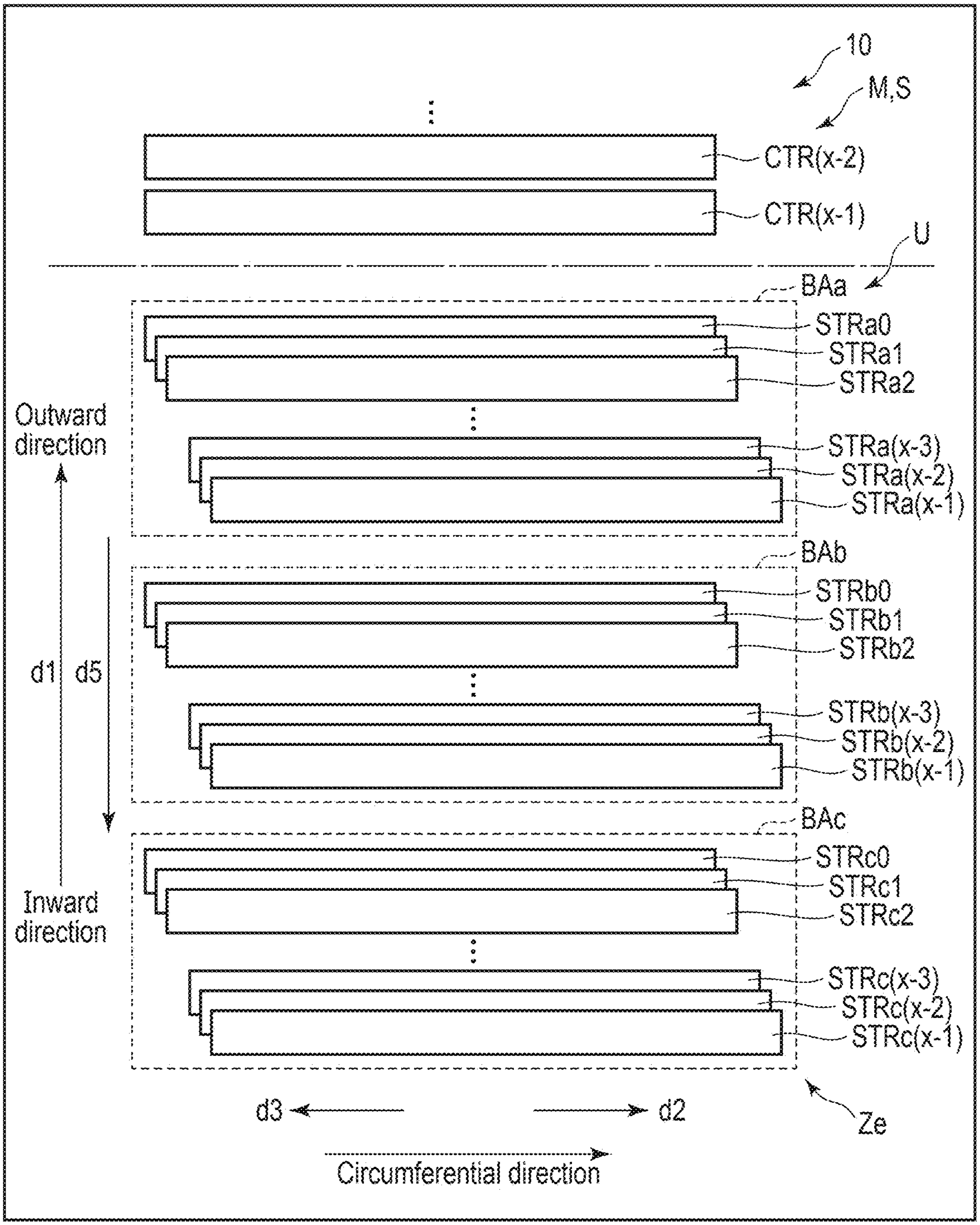
FIG. 6 is a schematic diagram showing an example of data write processing on the disk.

FIG. 6 is a schematic diagram showing an example of the data write processing on the disk DK. Each of the tracks STR and CTR is a data track. As shown in FIG. 6, the user data area U includes bands BAa, BAb, and BAc. The bands BAa, BAb, and BAc belong to the same zone Ze. In the zone Ze, the bands BAa, BAb, and BAc are intermittently arranged in the overwrite direction in the order of these bands.

The bands BAa and BAb are adjacent to each other in the radial direction d1, and the bands BAb and BAc are adjacent to each other in the radial direction d1.

The band BAa includes x tracks such as tracks STRa0, STRa1, STRa2, . . . , STRa(x−3), STRa(x−2), and STRa(x−1). The tracks STRa0 to STRa(x−1) are subjected to the shingled magnetic recording in the overwrite direction d5 in the order of these tracks. In the band BAa, the track STRa0 corresponds to a first track where the data is first written, and the track STRa(x−1) corresponds to the last track where the data is last written.

The band BAb includes x tracks such as tracks STRb0, STRb1, STRb2, . . . , STRb(x−3), STRb(x−2), and STRb (x−1). The tracks STRb0 to STRb(x−1) are subjected to the shingled magnetic recording in the overwrite direction d5 in the order of these tracks. In the band BAb, the track STRb0 corresponds to a first track where the data is first written, and the track STRb(x−1) corresponds to the last track where the data is last written.

The band BAc includes x tracks STRc0, STRc1, STRc2, . . . , STRc(x−3), STRc(x−2), and STRc(x−1). The tracks STRc0 to STRc(x−1) are subjected to the shingled magnetic recording in the overwrite direction d5 in the order of these tracks. In the band BAc, the track STRc0 corresponds to a first track where the data is first written, and the track STRc(x−1) corresponds to the last track where the data is last written.

The number of the tracks STR included in each of the bands BA belonging to the same zone Z is the same. For example, the number of the tracks STR included in each of the bands BA belonging to the zone Ze is the same. In other words, the number of the tracks STR included in the band BA is fixed for each zone Z. In this example, the number of tracks STR in each of the bands BA belonging to the zone Ze is x.

FIG. 6 shows tracks CTR(x−2) and CTR(x−1). In FIG. 6, the tracks CTR(x−2) and CTR(x−1) are subjected to the conventional magnetic recording in the media cache M or the system area S. The tracks CTR(x−2) and CTR(x−1) are adjacent to each other in the radial direction d1.

Figure 7:
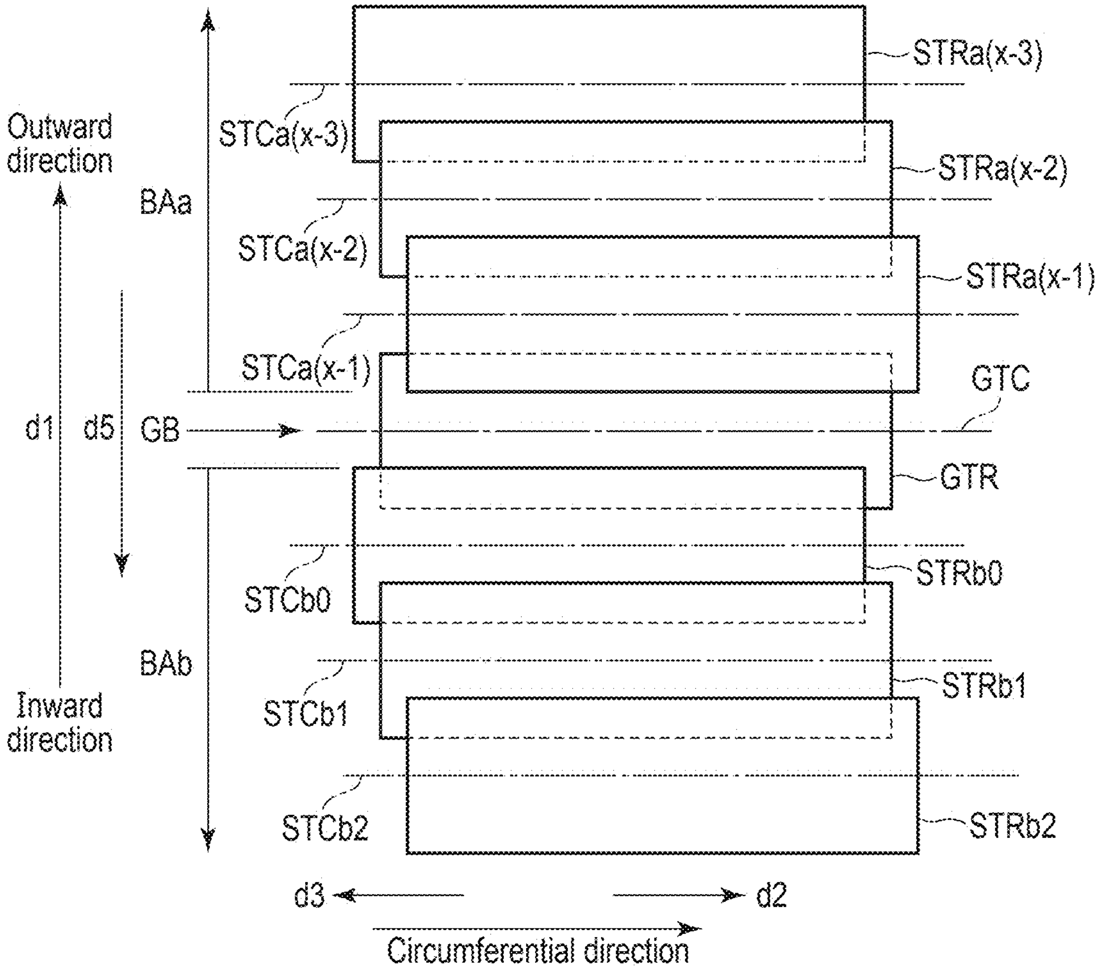
FIG. 7 is a schematic diagram showing two bands and one guard band of the user data area shown in FIG. 6.

FIG. 7 is a schematic diagram showing two bands BAa and BAb and one guard band GB of the user data area U shown in FIG. 6. As shown in FIG. 7, in the shingled magnetic recording, unlike the conventional magnetic recording, the MPU 60 manages a track group of the user data area U in units referred to as bands, with the feature of overwriting the data to a part of the track STR.

A guard band GB is generally provided between adjacent bands BA in the radial direction d1. The guard band GB includes a guard track GTR. Unlike the embodiment, the guard band GB may include a plurality of guard tracks GTR. The guard band GB has a role of suppressing the interference between the adjacent bands BA. The shingled magnetic recording can be executed in a unit of one band BA by the guard band GB. In addition, the ranges (bands BA) where the data is sequentially written can be separated by the guard band GB.

For example, the track center STCa(x−3) of the track STRa(x−3), the track center STCa(x−2) of the track STRa (x−2), the track center STCa(x−1) of the track STRa(x−1), the track center GTC of the guard track GTR, the track center STCb0 of the track STRb0, the track center STCb1 of the track STRb1, and the track center STCb2 of the track STRb2, are located at equal pitch in the overwrite direction d5.

The recording capacity of each band BA in the user data area U, except for the guard band GB, is generally predetermined based on the specifications required by the user. The MPU 60 can record the same capacity of data in each of the bands BA. In general, the recording capacity of each band BA is 128 MiB or 256 MiB.

Figure 8:
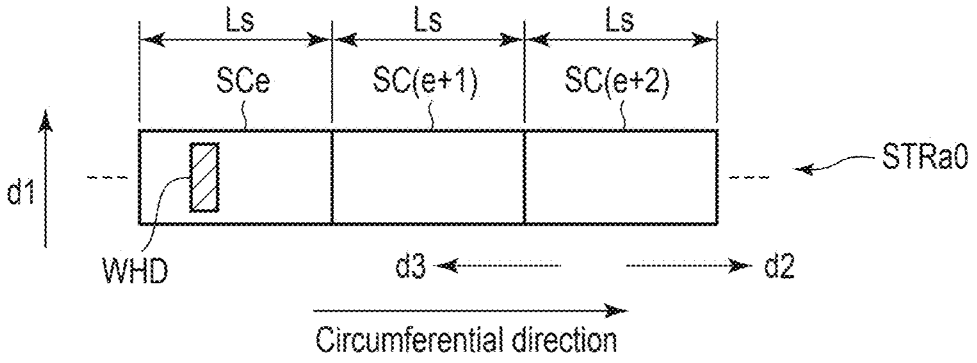
FIG. 8 is a schematic diagram showing three sectors of one track of the band shown in FIG. 6, and a write head.

FIG. 8 is a schematic diagram showing three sectors SCe, SC(e+1), and SC(e+2) of one track STRa0 of the band BAa shown in FIG. 6. As shown in FIG. 8, each of the tracks STR includes a plurality of sectors SC. The track STRa1 includes a plurality of sectors SC including sectors SCe, SC(e+1), and SC(e+2). The number of the sectors SC included in each of the tracks STR belonging to the same zone Z is the same. In the embodiment, the number of sectors SC included in each of the tracks STR belonging to the zone Ze is n.

Each of the sectors SC has a length Ls in the circumferential direction of the disk DK. Each sector SC may be a split sector that is divided by the servo sector SV. In this case, the length of the sector SC does not need to be Ls.

Comparative Example

Figure 9:
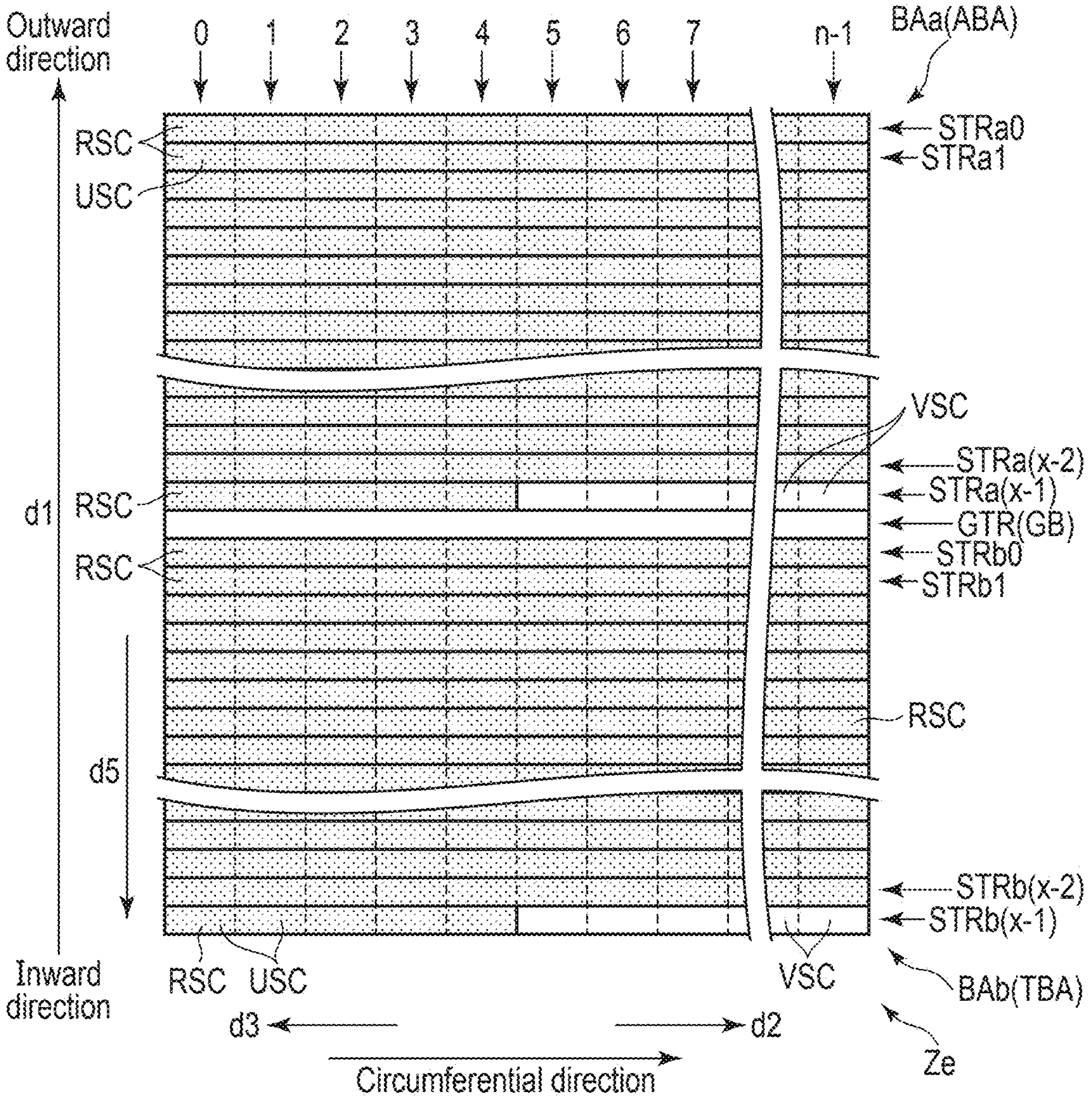
FIG. 9 is a schematic diagram showing two bands and one guard band, of a disk of a magnetic disk device according to a comparative example, illustrating a plurality of target sectors and a plurality of unused sectors.

Two bands BAa and BAb of the disk DK of the magnetic disk device 1 according to a comparative example, and one guard band GB will be described here. FIG. 9 is a schematic diagram showing two bands BAa and BAb and one guard band GB, of the disk DK of the magnetic disk device 1 according to the comparative example, illustrating a plurality of target sectors RSC and a plurality of unused sectors VSC.

In FIG. 9, each of the tracks STR has a rectangular shape for convenience of description. In reality, however, each track STR is curved along the circumferential direction. In addition, a plurality of tracks STR are made to overlap but are arranged in the overwrite direction d5. In reality, however, the plurality of tracks STR are arranged in the overwrite direction d5 while overlapping. In the figure, the target sector RSC is marked with a dot pattern. The unused sectors VSC are represented by a solid color.

As shown in FIG. 9, the band number of the band BAa is “a” and the band number of the band BAb is “b”. The track number of each band BA is “0” to “x−1”. The sector number of each track STR is “0” to “n−1”. In the following descriptions, the sector SC of each band BA may be identified by the following code “SC (track number, sector number)”.

In the present embodiment, the band BAa is a band adjacent to the band BAb, and is a band located above the band BAb in the overwrite direction d5.

Each of the tracks STR of the band BAa includes G target sectors RSC (one or more target sectors RSC) to which valid data is written. For example, the track STRa0 includes n target sectors RSC (G=n). All the sectors SC of the track STRa0 are the target sectors RSC. The track STRa(x−1) includes five target sectors RSC (G=5). The remaining sectors SC of the track STRa(x−1) are unused sectors VSC where valid data is not written.

Based on the above, the number of target sectors RSC in the track STRa0 is different from the number of target sectors RSC in the track STRa(x−1).

In each of the bands BA of the zone Ze, all sectors SC of x−1 tracks STR from number 0 to number x−2 are the target sectors RSC to which valid data is written, and are recording sectors USC. In the x−1-th track STR of each band BA of the zone Ze, five sectors SC from number 0 to number 4 are the target sectors RSC, and are recording sectors USC. In contrast, in the x−1-th track STR, remaining sectors SC from number 5 to number n−1 are the unused sectors VSC where valid data is not written.

Figure 10:
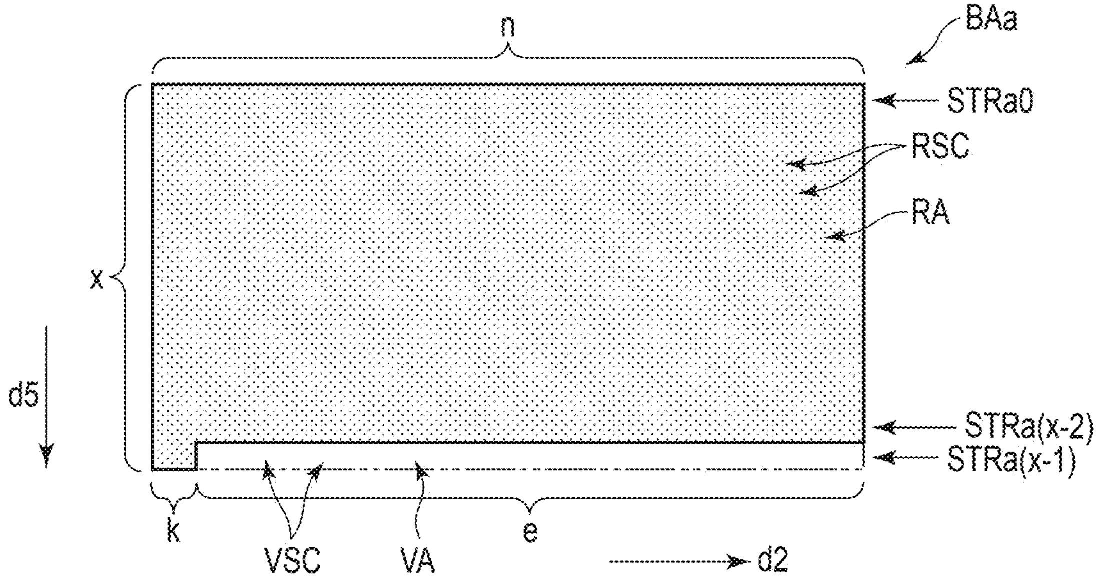
FIG. 10 is a diagram illustrating an arrangement of unused sectors according to the comparative example, showing one band shown in FIG. 9 and showing a state in which an adjustment unit does not adjust the arrangement of unused sectors of the band.

Next, the band BAa in FIG. 9 will be focused and a method of setting the band BAa will be described. FIG. 10 is a diagram illustrating an arrangement of the unused sectors VSC according to the comparative example, a schematic diagram showing one band BAa shown in FIG. 9, and a diagram showing a state in which the adjustment unit 62 does not adjust the arrangement of the unused sectors VSC of the band BAa. In FIG. 10, the band BAe has a rectangular shape. In reality, however, the band BAe is curved along the circumferential direction.

As shown in FIG. 10, in the band BAa, the number of a plurality of sectors SC of each track STRa is denoted by n, the number of a plurality of tracks STRe is denoted by x, the number of unused sectors VSC where valid data is not written, among a plurality of sectors SC of the band BAa, is denoted by e, and a difference obtained by subtracting the number e from the number n is denoted by k. In addition, the recording capacity of the band BAa is denoted by Cb, and the recording capacity of each sector SC is denoted by Cs.

The adjustment unit 62 obtains information on the recording capacity Cb, the recording capacity Cs, and the number n of sectors SC. The adjustment unit 62 can calculate the information on the liner recording density, which is the recording capacity per inch in the circumferential direction, from the recording capacity Cs and the number n of the sectors SC. The liner recording density can be expressed in bit per inch (BPI).

Incidentally, the adjustment unit 62 may obtain the information on the liner recording density instead of the number n of the sectors SC and calculate the number n of the sectors SC from the recording capacity Cs and the information on the liner recording density.

The number of tracks STRe per inch in the radial direction d1 is referred to as a track density. The track density can be expressed by track per inch (TPI).

The number of sectors SC in the band BAe necessary to obtain the recording capacity Cb is Cb/Cs. When the number n of a plurality of sectors SC in one track STRe, i.e., BPI is determined, the respective values of x and k mentioned above can be calculated using the following Expression 1 and the numerical value of e can be calculated. A relationship among n, e, and k mentioned above can be expressed by the following Expression 2.

$$Cb/Cs=n\times(x-1)+k \tag{1}$$

$$n=e+k \tag{2}$$

The adjustment unit 62 can finally determine the respective values of x, e, and k mentioned above, based on the information on the recording capacity Cb, the recording capacity Cs, and the number n of the sectors SC. In FIG. 10, an area with a dot pattern is an area where the data of 128 MiB or 256 MiB is recorded by the shingled magnetic recording processing, an area for securing the recording capacity Cb, and the recording area RA. An area without a dot pattern (blank area) is an unused area VA where no valid data is recorded. In the shingled magnetic recording, since the recording capacity Cb of each band is fixed, the unused area VA (unused sectors VSC) as shown in the figure exist.

The adjustment unit 62 sets n, x, k, and e mentioned above to the following numerical values, based on the determined BPI.

n=200 x=100 k=5 e=195

In the above case, n, x, k, and e are examples and their numerical values can be varied.

In the example of FIG. 10, the adjustment unit 62 does not adjust the arrangement of the unused sectors VSC in the band BAa. For this reason, a plurality of unused sectors VSC (unused area VA) are arranged in the last track STRa(x−1) where data is last written, in the band BAa.

Incidentally, in the magnetic disk device 1 of the comparative example and the magnetic disk device 1 of the above-described embodiment, the write head WHD is an energy assisted magnetic recording head for executing energy assisted magnetic recording (EAMR). The energy addition method used in the energy assisted magnetic recording is the heat assisted magnetic recording (HAMR) method. The heat assisted magnetic recording is also referred to as laser wave assisted recording. The above-mentioned write head WHD is a heat assisted magnetic recording head.

Since the heat assisted magnetic recording head can assist the magnetization inversion during data writing by heating the recording layer L of the disk DK with a laser and reducing the coercive force of the recording layer L, the heat assisted magnetic recording head can contribute to an increase in the recording density of the disk.

Figure 11:
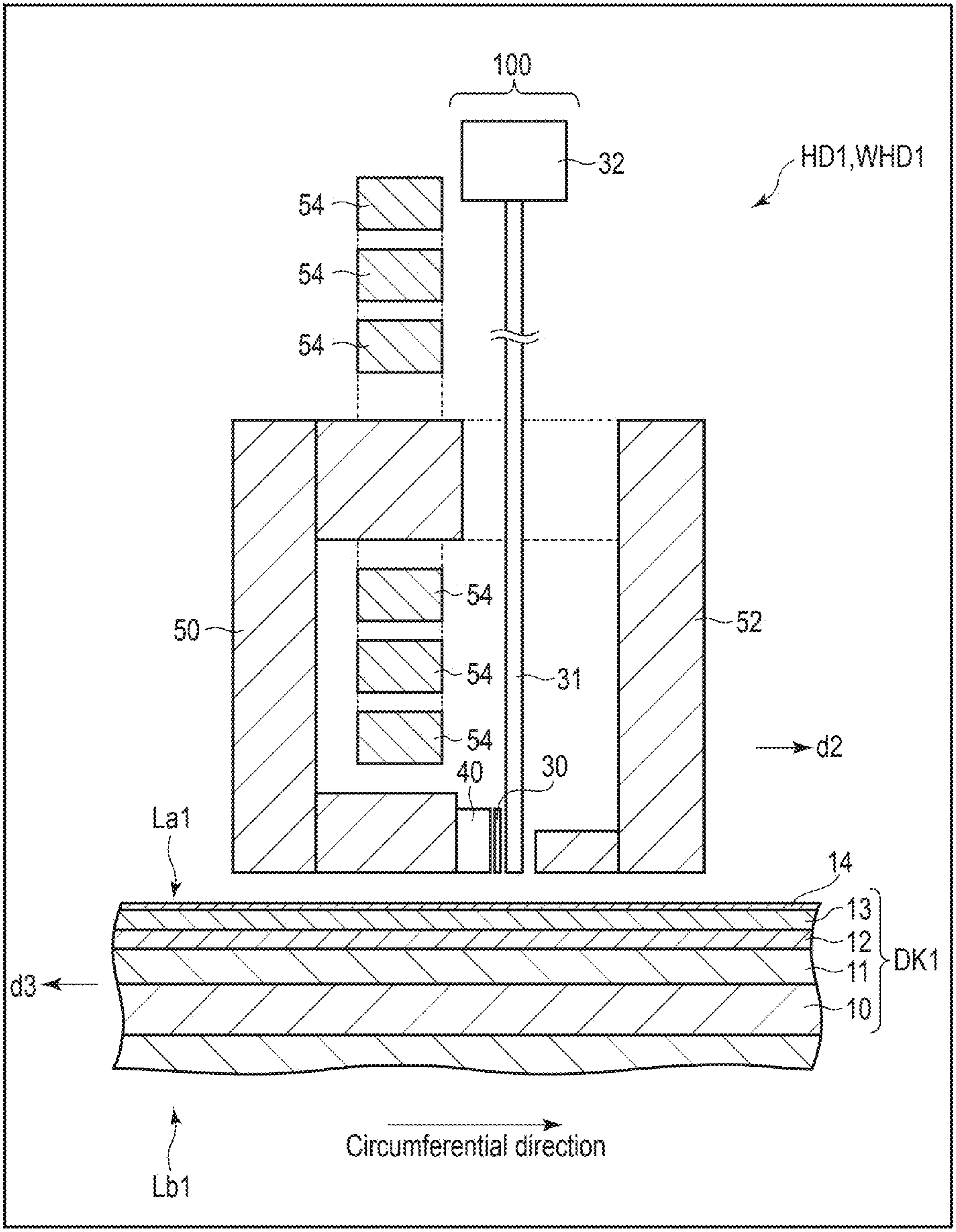
FIG. 11 is a cross-sectional view showing one disk shown in FIG. 2, and a write head.

Next, the write head WHD1, which is a heat assisted magnetic recording head, and the disk DK 1, will be described. FIG. 11 is a cross-sectional view showing one disk DK1 shown in FIG. 2, and one write head WHD1. FIG. 11 shows the write head WHD1 which includes a heat assisted unit 100 of the head HD.

As shown in FIG. 11, the disk DK1 is a recording medium formed in a disc shape in which a heat sink layer 11, a crystal orientation layer 12, a vertical recording layer 13, and a protective film 14 are stacked on a substrate 10 formed of a non-magnetic material. The first recording layer La1 of the disk DK1 is configured as described above.

The vertical recording layer 13 is a data recording layer provided above the substrate 10 and has a great anisotropy (perpendicular magnetic anisotropy) to the surface on the first recording layer La1 side of the disk DK1. The crystal orientation layer 12 is provided under the vertical recording layer 13 to improve the orientation of the vertical recording layer 13. The heat sink layer 11 is provided under the crystal orientation layer 12 to suppress the spread of the heating area. The protective film 14 is provided on the perpendicular recording layer 13 to protect the perpendicular recording layer 13.

In the example shown in FIG. 11, the head HD1 is a separated magnetic head in which the write head WHD1 and the read head RHD1 are separated. The write head WHD1 of the head HD1 includes, as its main elements, a main magnetic pole 40, a trailing yoke 50, a return shield magnetic pole 52, a coil 54, a near-field transducer 30, and a waveguide 31. The main magnetic pole 40 is formed of a high permeability material and generates a magnetic field perpendicular to the surface on the first recording layer La1 side of the disk DK1. The trailing yoke 50 is magnetically coupled to the main magnetic pole 40 to allow magnetic flux to flow through the main magnetic pole. The return shield magnetic pole 52 is provided to efficiently close the magnetic path directly below the main magnetic pole 40 on the leading side of the main magnetic pole 40. The coil 54 is provided to be wound around the magnetic path including the trailing yoke 50 and the return shield magnetic pole 52 to allow magnetic flux to flow to the main magnetic pole 40. The near-field transducer 30 generates near-field light to heat the first recording layer La1 of the disk DK1, on the leading side of the main magnetic pole 40. The waveguide 31 propagates the light which causes the near-field light to be generated.

The heat assisted unit 100 incorporates a semiconductor laser (laser diode) 32 which serves as a heat source of the near-field transducer 30. The near-field transducer 30 is formed of, for example, any one of Au, Pd, Pt, Rh, and Ir or an alloy consisting of a combination of some of these elements. An insulating layer interposed between the main magnetic pole 40 and the near-field transducer 30 is desirably, for example, an oxide formed of $SiO_2$, $Al_2O_3$, or the like.

The write head WHD1 including the heat assisted unit 100 generates near-field light from a tip of the transducer by applying light from the semiconductor laser 32 onto the near-field transducer 30, thereby locally heating the vertical recording layer 13. Since the coercive force sufficiently decreases at the heated portion of the vertical recording layer 13, during data writing, increase in the recording density at the corresponding portion of the vertical recording layer 13 is attempted.

The R/W channel 140 controls the heat assisted unit 100 of the write head WHD1 via the head amplifier IC 130 and controls the light output of the semiconductor laser 32. The light output is the output of the preheat current and operation current applied to the semiconductor laser 32. The preheat current is a current of a magnitude which does not cause the data already written on the disk DK1 to be erased. The operation current is the current applied to the semiconductor laser 32 to generate the near-field light from the near-field transducer 30 when writing the data to the disk DK1 using the write head WHD1.

As described above, the heat assisted magnetic recording head contributes to improving the recording density of the disk DK. However, when sequential write to a band BA is executed by selecting the shingled magnetic recording, a modehop phenomenon may occur due to the rise in temperature of the semiconductor laser 32 during the write processing, and the quality of data in the band BA may be degraded.

Figure 12:
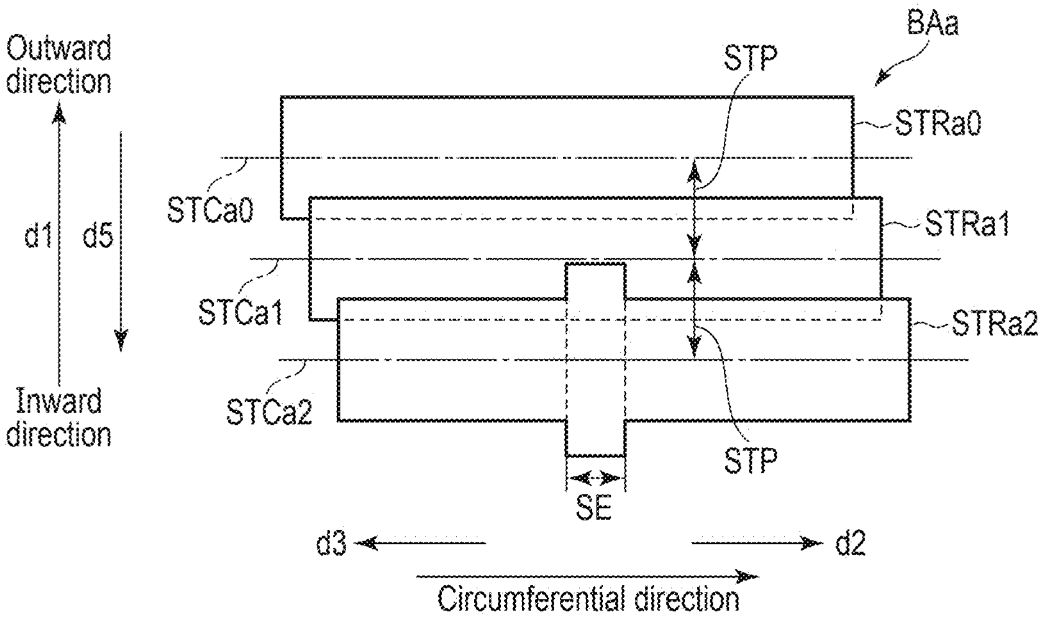
FIG. 12 is a schematic diagram showing the band according to the comparative example, illustrating a state in which a modehop phenomenon occurs while selecting shingled magnetic recording and executing sequential write to the band.

FIG. 12 is a schematic diagram showing the band BAa according to the comparative example, illustrating a state in which a modehop phenomenon occurs while selecting the shingled magnetic recording and executing sequential write to the band BAa.

As shown in FIG. 12, sequential write to the band BAa is executed by selecting the shingled magnetic recording method. When write processing for the track STRa2 is executed consecutively after write processing for the tracks STRa0 and STRa1 of the band BAa, the modehop phenomenon occurs during write processing for a specific range SE in the middle of the track STRa2. The specific range SE extends over a plurality of target sectors RSC that are continuous in the circumferential direction.

When the modehop phenomenon occurs, the power of the semiconductor laser 32 fluctuates, causing the write width in the radial direction d1 to undesirably expand in the specific range SE, and leading to deterioration in write quality. Data is excessively overwritten to the data in the range SE of the track STRa1 adjacent to the range SE of the track STRa2. Since the width of the track STRa1 in the radial width d1 to ensure the data quality cannot be maintained, deterioration in the data quality of the track STRa1 is caused.

Figure 13:
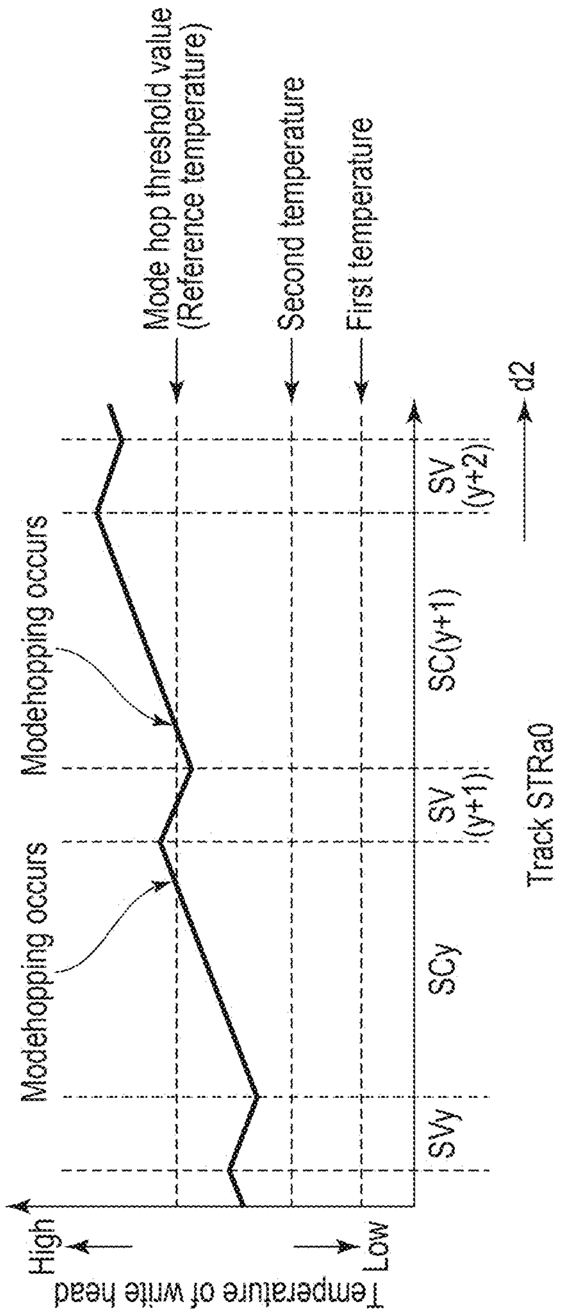
FIG. 13 is a graph showing the variation in temperature of the write head during a period of executing the write processing for the band according to the comparative example.

FIG. 13 is a graph showing the variation in temperature of the write head WHD1 during a period of executing the write processing for the band BAa according to the comparative example.

As shown in FIG. 13, when the write processing for a track STRaq of the band BAa is focused, the semiconductor laser 32 is heated, causing the temperature of the write head WHD1 to rise and exceed a modehop threshold value (reference temperature), during the write processing for a data sector SCy. As a result, the modehopping occurs. After that, since the semiconductor laser 32 is not heated or is heated to a lower temperature than that during the write processing, during the period for servo-reading the servo sector SV(y+1), the temperature of the write head WHD1 decreases and falls below the modehop threshold value. Next, during the write processing for a data sector SC(y+1), the semiconductor laser 32 is heated again, causing the temperature of the write head WHD1 to rise and exceed the modehop threshold value again. For this reason, modehopping occurs again.

As described above, since the temperature of the write head WHD1 repeatedly rises and falls, modehopping is likely to occur continuously across the plurality of data sectors SC in the circumferential direction. The adjustment unit 62 can derive the temperature of the write head WHD1, based on the temperature information detected by the sensor SEN and the drive information of the write head WHD1. When the sensor SEN is mounted on the slider and can detect the temperature information of the write head WHD1, the adjustment unit 62 can derive the temperature of the write head WHD1, based on the temperature information detected by the sensor SEN.

By suspending the write processing and making rotational delay of the disk DK1 before the temperature of the write head WHD1 exceeds the modehop threshold value, the temperature of the write head WHD1 can be significantly lowered. Accordingly, occurrence of the modehopping can be suppressed or prevented. However, since the rotational delay of the disk DK1 occurs, decrease in write performance may be caused and the time required for the write processing for the band BAa may be extended.

For this reason, there is a need for a technology which can contribute to the improvement of the recording density of the disk DK using the heat assisted magnetic recording head, i.e., the write head WHD1, and which can avoid the decrease in write performance.

Next, each of examples of the magnetic disk device 1 and the write processing method capable of obtaining the above technology will be described.

Example 1 of Embodiment

Figure 14:
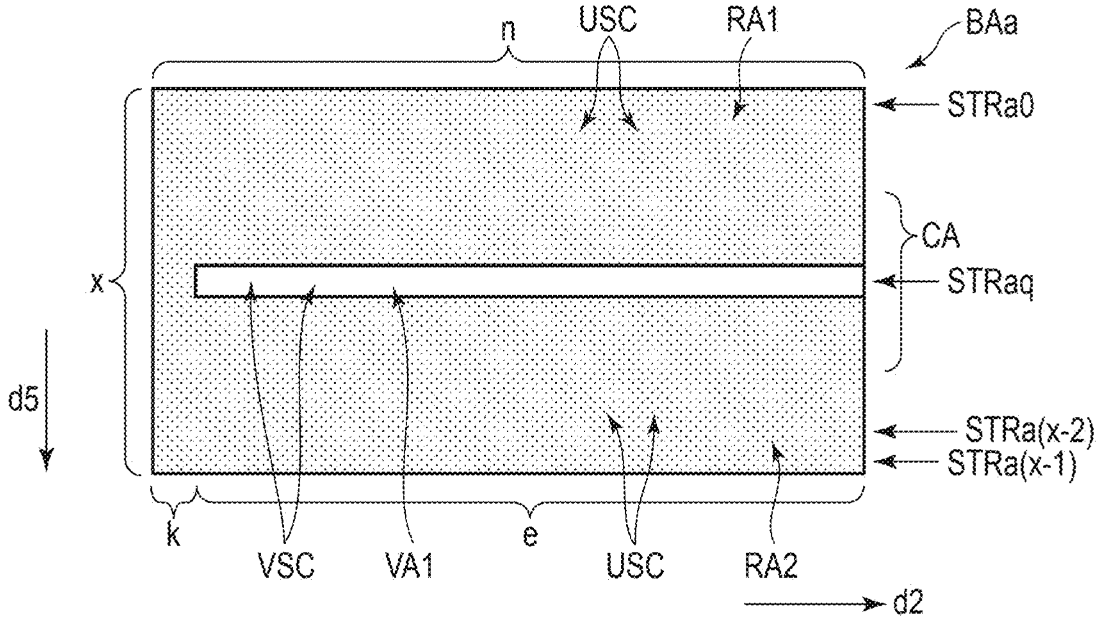
FIG. 14 is a diagram illustrating an arrangement of unused sectors according to example 1 of the embodiment, showing one band shown in FIG. 7 and showing a state in which an adjustment unit adjusts the arrangement of unused sectors of the band.

First, the magnetic disk device 1 and the write processing method according to example 1 will be described. FIG. 14 is a diagram illustrating an arrangement of the unused sectors VSC according to the example 1, a schematic diagram showing one band BAa shown in FIG. 7, and a diagram showing a state in which the adjustment unit 62 adjusts the arrangement of the unused sectors VSC of the band BAa. In FIG. 14, the band BAe has a rectangular shape. In reality, however, the band BAe is curved along the circumferential direction.

As shown in FIG. 14 and FIG. 1, a plurality of sectors SC of the band BAa include a plurality of recording sectors USC where valid data are written and a plurality of unused sectors VSC where valid data are not written, other than the plurality of recording sectors USC. The write processing unit 61*a* urges the write head WHD1 to execute write (sequential write) of the data to the band (first band) BAa. At this time, the adjustment unit 62 arranges one or more unused sectors VSC among the plurality of unused sectors VSC in the tracks STRa other than the last track STRa(x−1) where the data is last written.

When the write of data to the band BAa is executed, the adjustment unit 62 can derive the temperature of the write head WHD1 based on the temperature information of the atmosphere inside the housing HO or the temperature information of the head HD1, and can adjust the arrangement of the plurality of unused sectors VSC based on the temperature of the write head WHD1.

The adjustment unit 62 can arrange an unused area (first unused area) VA1 including a plurality of unused sectors VSC, in the track STRa during the sequential write of the data to the band BAa. The temperature of the semiconductor laser 32 can be lowered while the write head WHD1 travels over an unused area VA1. The temperature of the semiconductor laser 32 can be lowered early as compared to the case where the unused area VAL is arranged in the track STRa (x−1). The temperature margin for the temperature of the write head WHD1 to reach the modehop threshold value can be extended.

The timing when the temperature of the write head WHD1 starts rising is the time when the write head WHD1 starts traveling over the recording area RA again. Accordingly, the situation in which the temperature of the write head WHD1 reaches the modehop threshold value can be avoided.

In addition, the adjustment unit 62 does not change the number of the plurality of unused sectors VSC in the band BAa, but only changes the arrangement of the unused sectors VSC. Therefore, the recording capacity of the band BAa is not damaged.

As described above, since the write head WHD1, which is the heat assisted magnetic recording head, can be used, the write head can contribute to the improvement of the recording density of the disk DK.

Since there is no need to incorporate a rotational delay operation of making the rotational delay of the disk DK1 while the write head WHD1 is traveling over the recording area RA, a decrease in write performance can be avoided.

Since the occurrence of the modehopping can be avoided, excessive overwriting to the data of the adjacent track STRa can be suppressed during the write processing for the track STRa of the band BAa. Since the data of the adjacent track STRa can easily be secured, the deterioration in data quality of the band BAa can be suppressed.

The band BAa includes a central area CA, which is the central area in the overwrite direction d5. The central area CA is the area which includes a middle track STRaq between the first track STRa0 where the data is first written to the band BAa and the last track STRa(x−1), in the overwriting direction d5, and is the area centered in the track STRaq in the overwrite direction d5. In the example 1, the number of tracks STRa in the band BAa is 100 (x=100), and the central area CA is an area including 40 to 60 tracks STRa. Incidentally, the number of tracks STRa in the central area CA can be changed in accordance with the number x mentioned above.

When writing the data to the band BAa is executed, the adjustment unit 62 arranges an unused area VA1 including one or more unused sectors VSC among the plurality of unused sectors VSC, in a track STRa belonging to the central area CA among a plurality of tracks STRa of the band BAa. For example, the unused area VAL is arranged in the middle track STRaq of the band BAa in the overwrite direction d5.

The above arrangement of the unused area VA1 is suitable when the temperature of the write head WHD1 at the start of writing the data to the band BAa is the first temperature shown in FIG. 13. As compared to a case where the temperature of the write head WHD1 at the start of writing the data to the band BAa is the second temperature shown in FIG. 13, the temperature rise of the write head WHD1 can be more tolerated. Therefore, a period for lowering the temperature of the write head WHD1 can be set by the unused area VA1 after writing the data to the band BAa has been executed for a while.

The first temperature is a temperature lower than the reference temperature (modehop threshold value). The second temperature is a temperature higher than the first temperature and lower than the reference temperature. For example, the first temperature is 25° C., the second temperature is 35° C., and the reference temperature is 50° C.

The unused area VA1 includes all unused sectors VSC (e unused sectors VSC) existing in the band BAa. Thus, even if all unused sectors VSC are included in a single unused area VA1, the above-described effect can be obtained.

A plurality of data sectors SC in the band BAa can be classified into a plurality of recording sectors USC belonging to a recording area (first recording area) RA1, a plurality of unused sectors VSC belonging to the unused area VA1, and a plurality of recording sectors USC belonging to a recording area (second recording area) RA2. The recording area RA1, the unused area VA1, and the recording area RA2 are arranged sequentially in the write direction. The above-described write direction is the direction in which the data are written sequentially to the plurality of recording sectors USC of the band BAa. When the track STRaq is focused, the write head WHD1 first travels above k data sectors SC (k record sectors USC) that are to belong to the recording area RA1, and finally travels above e data sectors SC (e unused sectors VSC) that are to belong to the unused area VA1.

Figure 15:
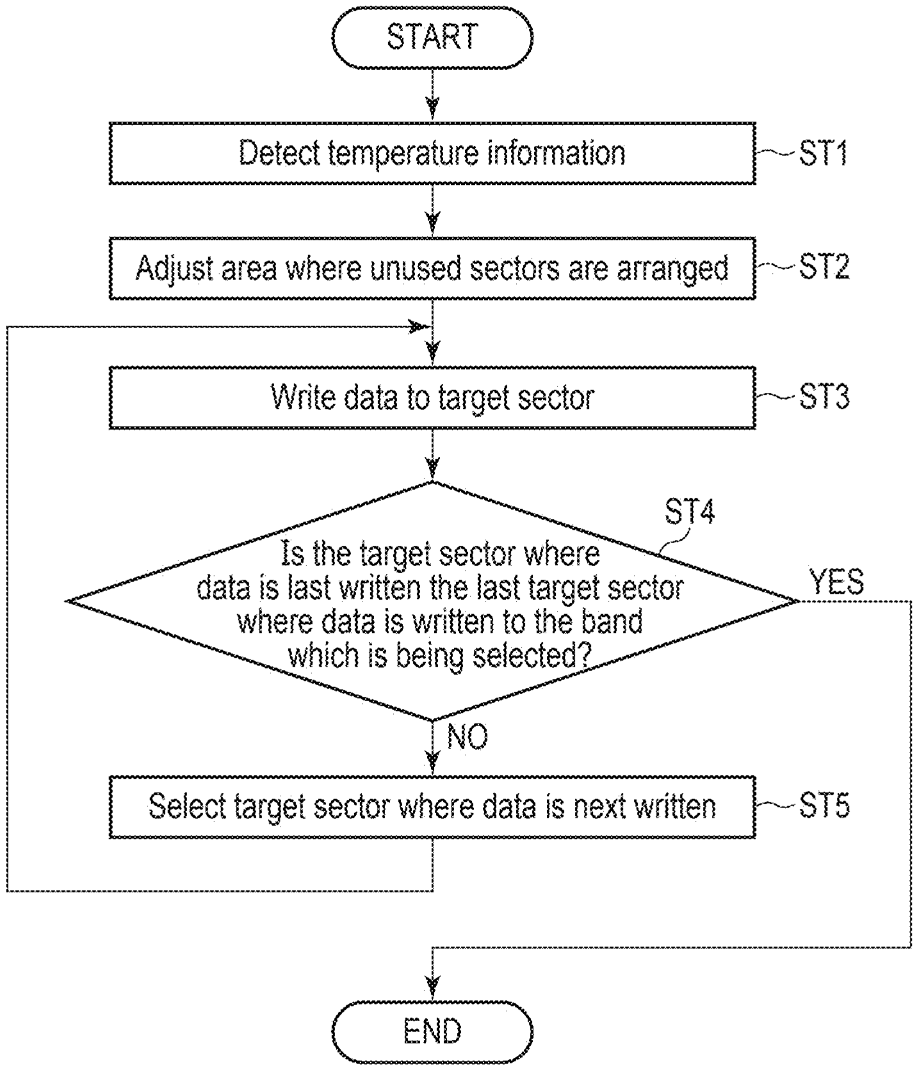
FIG. 15 is a flowchart showing a write processing method applied to the magnetic disk device according to the embodiment.

A write processing method applied to the magnetic disk device 1 according to a plurality of examples of the embodiment including the above-described example 1 will be described here. FIG. 15 is a flowchart showing a write processing method applied to the magnetic disk device 1 according to the above-described embodiment.

As shown in FIG. 15, FIG. 1, and FIG. 14, when the write processing for the band BAa is started, the sensor SEN detects the temperature information in step ST1. Then, in step ST2, the adjustment unit 62 derives the temperature of the write head WHD1, based on the temperature information detected by the sensor SEN, and adjusts the area where the plurality of unused sectors VSC are arranged, based on the temperature of the write head WHD1.

Then, in step ST3, the write processing unit 61*a* writes data to the data sector (target sector) SC of the band BAa, which is the target of the write. After that, in step ST4, the write processing unit 61*a* determines whether the data sector (target sector) SC where the data is last written is the last data sector (target sector) SC for writing the data to the band BAa which is being selected.

If the data sector SC where the data is last written is not the last data sector SC for writing the data to the band BAa which is being selected (step ST4, NO), the processing shifts to step ST5, the write processing unit 61*a* selects the data sector (target sector) SC to which data is to be next written from the band BAa which is being selected, and the processing shifts to step ST3.

In contrast, if the data sector SC where the data is last written is the last data sector SC for writing the data to the band BAa which is being selected (step ST4, YES), the write processing for the band BAa is ended.

Example 2 of Embodiment

Figure 16:
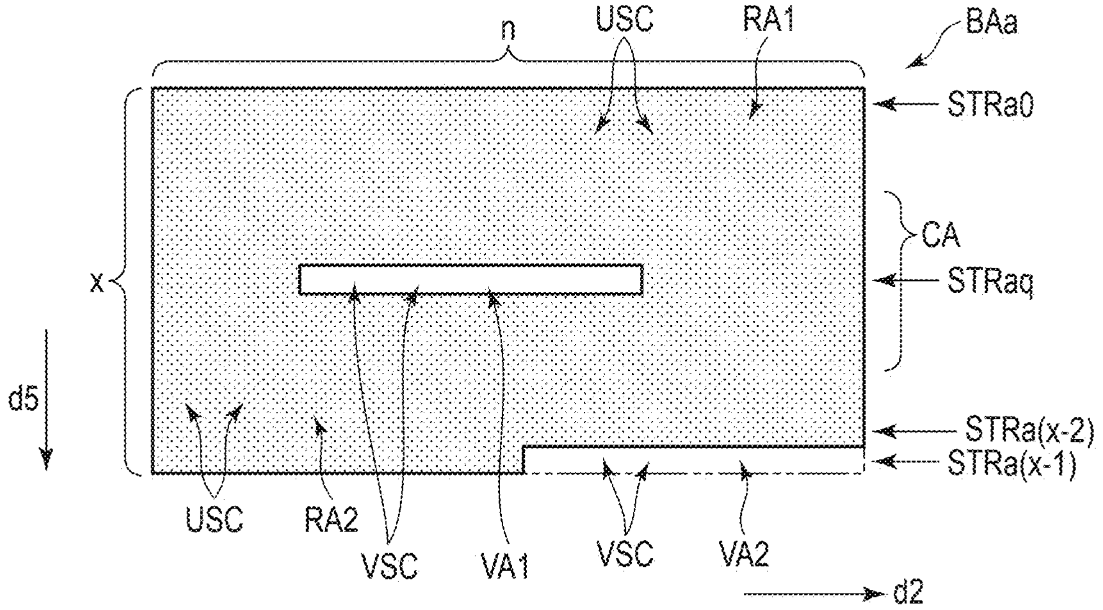
FIG. 16 is a diagram illustrating an arrangement of unused sectors according to example 2 of the embodiment, showing one band shown in FIG. 7 and showing a state in which an adjustment unit adjusts the arrangement of unused sectors of the band.

Next, the magnetic disk device 1 and the write processing method according to example 2 will be described. FIG. 16 is a diagram illustrating an arrangement of the unused sectors VSC according to the example 2, a schematic diagram showing one band BAa shown in FIG. 7, and a diagram showing a state in which the adjustment unit 62 adjusts the arrangement of the unused sectors VSC of the band BAa. In FIG. 16, the band BAe has a rectangular shape. In reality, however, the band BAe is curved along the circumferential direction.

As shown in FIG. 16 and FIG. 1, the arrangement of the unused area VA is the same as that in the Example 1 (FIG. 14) except that the unused area VA of the band BAa is divided into an unused area (first unused area) VA1 and an unused area (second unused area) VA2. The unused area VA1 includes a plurality of unused sectors VSC and is arranged in the track STRaq (central area CA). The unused area VA2 includes a plurality of unused sectors VSC and is arranged in the track STRa(x−1). In other words, the adjustment unit 62 may arrange several unused sectors VSC in the tracks STRa other than the track STRa(x−1).

The above arrangement of the unused area VA1 is suitable when the temperature of the write head WHD1 at the start of writing the data to the band BAa is the first temperature shown in FIG. 13. If the temperature of the write head WHD1 sufficiently is lowered during the period when the write head WHD1 is traveling above the unused area VA1, it is not necessary to assign all unused sectors VSC to the unused area VA1.

In addition, since the unused area VA2 is arranged in the track STRa(x−1), the temperature of the write head WHD1 can be lowered in advance before starting the sequential write for the band BA where the write processing is to be executed subsequently to the band BAa.

Example 3 of Embodiment

Figure 17:
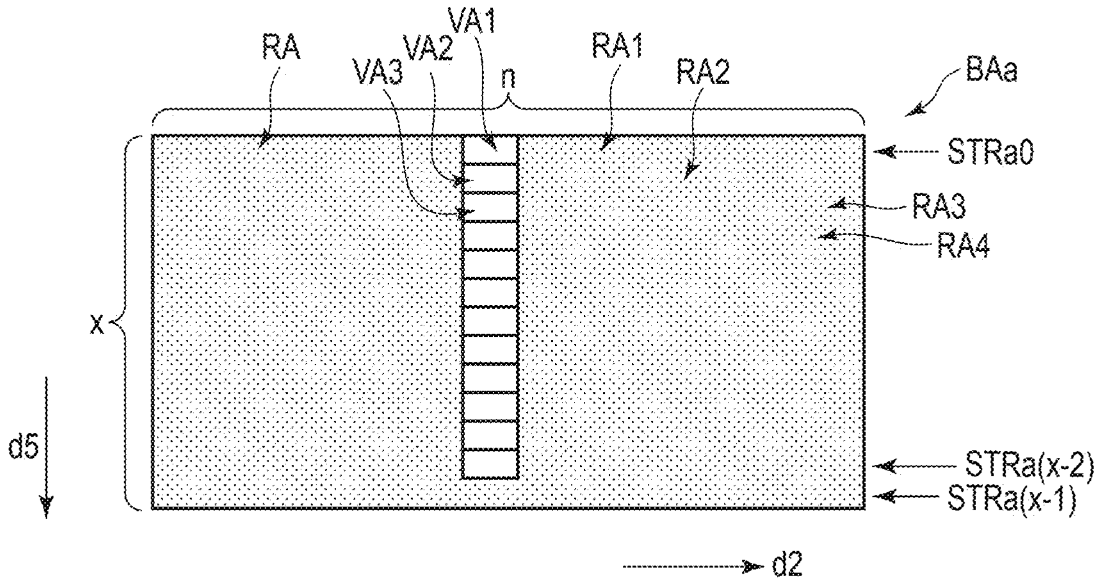
FIG. 17 is a diagram illustrating an arrangement of unused sectors according to example 3 of the embodiment, showing one band shown in FIG. 7 and showing a state in which an adjustment unit adjusts the arrangement of unused sectors of the band.

Next, the magnetic disk device 1 and the write processing method according to example 3 will be described. FIG. 17 is a diagram illustrating an arrangement of the unused sectors VSC according to the example 3, a schematic diagram showing one band BAa shown in FIG. 7, and a diagram showing a state in which the adjustment unit 62 adjusts the arrangement of the unused sectors VSC of the band BAa. In FIG. 17, the band BAe has a rectangular shape. In reality, however, the band BAe is curved along the circumferential direction.

As shown in FIG. 17 and FIG. 1, it may be desirable to arrange the unused sectors VSC in each track STRa and lower the temperature of the write head WHD1 at short time intervals, depending on the rise characteristics of the temperature of the semiconductor laser 32. In the example 3, each of the tracks STRa0 to STRa(x−2) has one unused area VA, and each unused area VA includes at least one unused sector VSC.

The band BAa includes a plurality of unused areas VA such as the unused area (first unused area) VA1 of the track STRa0, the unused area (second unused area) VA2 of the track STRa1, and the unused area (third unused area) VA3 of the track STRa2. In addition, the band BAa includes a plurality of recording areas RA such as the recording area RA1 and the recording area RA2.

When writing the data to the band BAa is executed, the adjustment unit 62 can intermittently arrange in the write direction, sequentially, the unused area VA1 including one or more unused sectors VSC among the plurality of unused sectors VSC, the unused area VA2 including one or more other unused sectors VSC among the plurality of unused sectors VSC, the unused area VA3 including one or more other unused sectors VSC among the plurality of unused sectors VSC, and the like.

In the example 3, the number of a plurality of recording sectors USC belonging to the recording area RA1 between the unused area VA1 and the unused area VA2 in the write direction is the same as the number of the plurality of recording sectors USC belonging to the recording area RA2 between the unused area VA2 and the unused area VA3 in the write direction. Incidentally, the number of the plurality of recording sectors USC belonging to a recording area (third recording area) RA3 next to the recording area RA2, the number of the plurality of recording sectors USC belonging to a recording area (fourth recording area) RA4 next to the recording area RA3, and the like are also the same as the number of the plurality of recording sectors USC belonging to the recording area RA1.

In addition, the number of unused sectors VSC belonging to each unused area VA, such as the number of one or more unused sectors VSC belonging to the unused area VA1, the number of one or more unused sectors VSC belonging to the unused area VA2, and the number of one or more unused sectors VSC belonging to the unused area VA3, is the same.

In addition, as the temperature of the write head WHD1 at the start of writing the data to the band BAa becomes higher, the unused sectors VSC may be more arranged on the leading side of the band BAa.

When the write of the data to the band BAa is executed, the adjustment unit 62 first arranges the unused area VA1 including one or more unused sectors VSC among the plurality of unused sectors VSC, in the band BAa. The adjustment unit 62 can arrange the unused area VA1 at the first position when deriving the first temperature of the write head WHD1. For example, the position of the unused area VA1 in FIG. 14 is the first position mentioned above.

In addition, the adjustment unit 62 can arrange the unused area VA1 at the second position when deriving the second temperature of the write head WHD1. The second position is located on the first recording sector USC side relative to the first position in the write direction. Incidentally, the first recording sector USC is the leading data sector SC where the data is first written, in the first track STRa0. For example, the position of the unused area VA1 in FIG. 17 is the second position mentioned above. As described above, the position of the unused area VA1 arranged in the band BAa may be adjusted by considering the temperature of the write head WHD1 at the start of writing the data to the band BAa.

Example 4 of Embodiment

Figure 18:
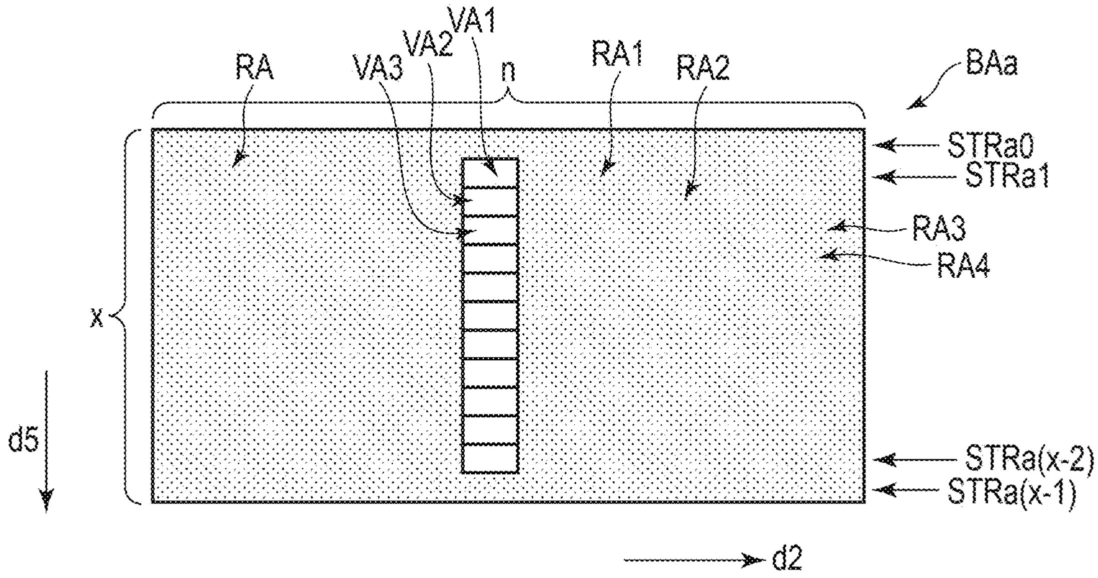
FIG. 18 is a diagram illustrating an arrangement of unused sectors according to example 4 of the embodiment, showing one band shown in FIG. 7 and showing a state in which an adjustment unit adjusts the arrangement of unused sectors of the band.

Next, the magnetic disk device 1 and the write processing method according to example 4 will be described. FIG. 18 is a diagram illustrating an arrangement of the unused sectors VSC according to the example 4, a schematic diagram showing one band BAa shown in FIG. 7, and a diagram showing a state in which the adjustment unit 62 adjusts the arrangement of the unused sectors VSC of the band BAa. In FIG. 18, the band BAe has a rectangular shape. In reality, however, the band BAe is curved along the circumferential direction.

As shown in FIG. 18 and FIG. 1, if the temperature of the write head WHD1 at the time of starting writing the data to the band BAa is lower than the temperature (above-mentioned second temperature) in the example 3 (FIG. 17), the temperature margin becomes greater until the temperature of the write head WHD1 reaches the modehop threshold value. Therefore, as compared to the example 3 (FIG. 17), the time period in which the data is first written to the band BAa can be made longer. In other words, the number of recording sectors USC included in the recording area RA first arranged in the band BAa can be increased.

Example 5 of Embodiment

Figure 19:
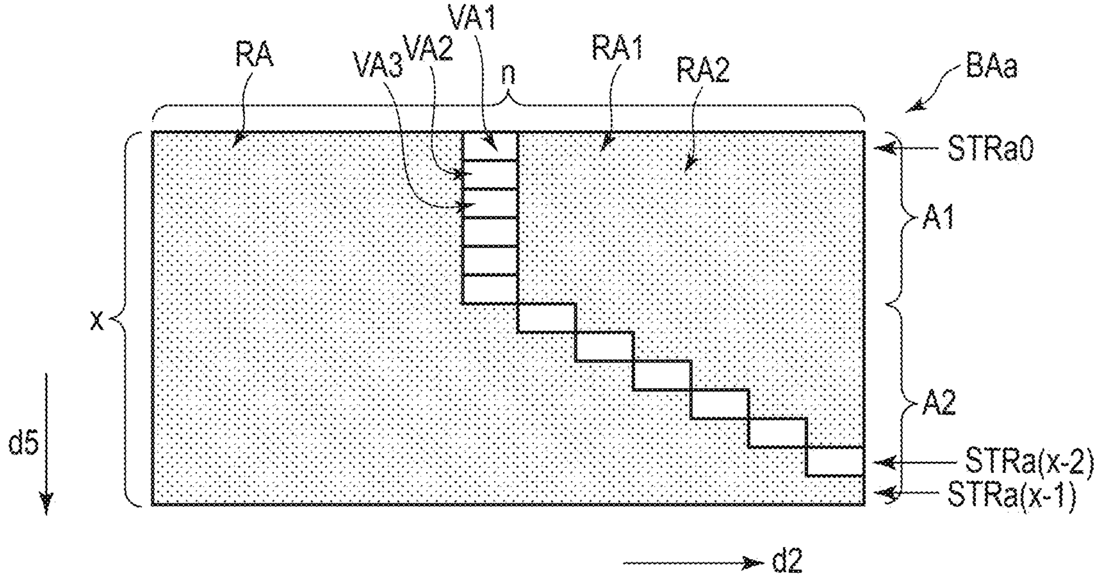
FIG. 19 is a diagram illustrating an arrangement of unused sectors according to example 5 of the embodiment, showing one band shown in FIG. 7 and showing a state in which an adjustment unit adjusts the arrangement of unused sectors of the band.

Next, the magnetic disk device 1 and the write processing method according to example 5 will be described. FIG. 19 is a diagram illustrating an arrangement of the unused sectors VSC according to the example 5, a schematic diagram showing one band BAa shown in FIG. 7, and a diagram showing a state in which the adjustment unit 62 adjusts the arrangement of the unused sectors VSC of the band BAa. In FIG. 19, the band BAe has a rectangular shape. In reality, however, the band BAe is curved along the circumferential direction.

As shown in FIG. 19 and FIG. 1, the band BAa includes a first area A1 to which the first track STRa0 belongs and a second area A2 to which the last track STRa(x−1) belongs. When writing the data to the first area A1 of the band BAa is executed, the adjustment unit 62 arranges a plurality of recording sectors USC and a plurality of unused sectors VSC in the first area A1, in the first pattern. When writing the data to the second area A2 of the band BAa is executed after a time interval following writing the data to the first area A1, the adjustment unit 62 can arrange a plurality of recording sectors USC and a plurality of unused sectors VSC in the second area A2, in a second pattern different from the first pattern.

Interrupting the sequential write to the band BAa and resuming the sequential write to the band BAa after a time period has elapsed will be focused. The temperature of the write head WHD1 at the time when writing the data to the first area A1 of the band BAa is started may be different from the temperature of the write head WHD1 at the time when writing the data to the second area A2 of the band BAa is started. If the temperatures are different, the arrangement pattern of the plurality of recording sectors USC and the plurality of unused sectors VSC may be different in the first area A1 and the second area A2.

Example 6 of Embodiment

Figure 20:
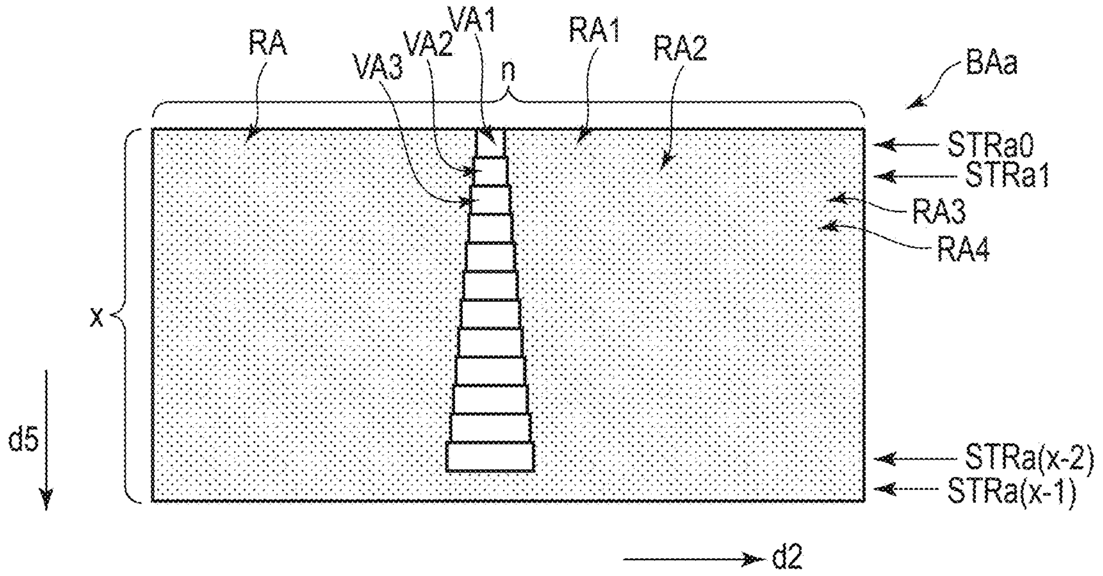
FIG. 20 is a diagram illustrating an arrangement of unused sectors according to example 6 of the embodiment, showing one band shown in FIG. 7 and showing a state in which an adjustment unit adjusts the arrangement of unused sectors of the band.

Next, the magnetic disk device 1 and the write processing method according to example 6 will be described. FIG. 20 is a diagram illustrating an arrangement of the unused sectors VSC according to the example 6, a schematic diagram showing one band BAa shown in FIG. 7, and a diagram showing a state in which the adjustment unit 62 adjusts the arrangement of the unused sectors VSC of the band BAa. In FIG. 20, the band BAe has a rectangular shape but, in reality, the band BAe is curved along the circumferential direction.

As shown in FIG. 20 and FIG. 1, the number of recording sectors USC in each recording area RA may be different, and the number of data sectors SC of each unused area VA may also be different, in the band BAa. For example, the number of the unused sectors VSC in the unused area VA may be reduced in the unused areas VA located on the track STRa0 side while the number of the data sectors SC in the unused area VA may be increased in the unused areas VA located on the track STRa(x−2) side.

The unused area VA1, the unused area VA2, and the unused area VA3 will be focused here. The number of one or more unused sectors VSC belonging to the unused area VA2 is greater than or equal to the number of one or more unused sectors VSC belonging to the unused area VA1. The number of one or more unused sectors VSC belonging to the unused area VA3 is greater than or equal to the number of one or more unused sectors VSC belonging to the unused area VA2.

According to the magnetic disk device 1 and the write processing method of the embodiment configured as described above, the magnetic disk device 1 comprises the disk DK1, the write head WHD1, the write processing unit 61*a*, the adjustment unit 62, and the like. The write head WHD1 is a heat assisted magnetic recording head. The write processing unit 61*a* can urge the write head WHD1 to select the shingled magnetic recording and to write the data to each of the bands BA.

When the write processing unit 61*a* urges the write head WHD1 to execute the write of the data to the band BAa, the adjustment unit 62 can arrange one or more unused sectors VSC among the plurality of unused sectors VSC in the tracks STRa other than the last track STRa(x−1).

The temperature of the semiconductor laser 32 can be lowered while the write head WHD1 travels over the unused sector VSC (unused area VA). Therefore, the probability of occurrence of the modehopping can be lowered, or the situation in which the temperature of the write head WHD1 reaches the modehop threshold value can be avoided.

In addition, the adjustment unit 62 does not change the number of the plurality of unused sectors VSC in the band BAa, but only changes the arrangement of the unused sectors VSC. Therefore, the recording capacity of the band BAa is not damaged.

Since the write head WHD1, which is the heat assisted magnetic recording head, can be used, the write head can contribute to the improvement of the recording density of the disk DK.

Since there is no need to incorporate a rotational delay operation of making the rotational delay of the disk DK1 while the write head WHD1 is traveling over the recording area RA, a decrease in write performance can be avoided.

In a case where the occurrence of the modehopping can be avoided, excessive overwriting to the data of the adjacent track STRa can be suppressed during the write processing for the track STRa of the band BAa. Since the data of the adjacent track STRa can easily be secured, the deterioration in data quality of the band BAa can be suppressed.

Based on the above, the magnetic disk device 1 and the write processing method that can improve the recording density of the disk DK can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the above-described technology may be applied not only to the magnetic disk devices of hybrid recording type, but also to magnetic disk devices of shingled magnetic recording type.

If the band BAa includes a data sector SC having a defect, the defective data sector SC may be used as an unused sector VSC.

A plurality of data sectors SC in the band BAa include defective sectors. When writing the data to the band BAa is executed, the adjustment unit 62 can arrange one of the plurality of unused sectors VSC as the defective sector. Since the unused sectors VSC can be arranged in not normal data sectors SC, but defective sectors, the decrease in the use efficiency of the plurality of data sectors SC in the band BAa can be suppressed.

The number of the plurality of data sectors SC in each track STRa of the band BAa is denoted by n. When writing the data to the band BAa is executed, the adjustment unit 62 can arrange ten or more, and less than n unused sectors VSC in the tracks other than the last track STRa(x−1). The adjustment unit 62 can arrange the unused sectors VSC in not only defective sectors, but also normal data sectors SC. Since the period for lowering the temperature of the write head WHD1 early can be secured, the probability of occurrence of the modehopping can be lowered or the occurrence of modehopping can be avoided.

What is claimed is:

1. A magnetic disk device comprising:

a disk having a plurality of bands each including a plurality of tracks in a recording layer, the plurality of bands including a first band, each of the tracks including a plurality of data sectors;

a write head writing data to the recording layer, the write head being a heat assisted magnetic recording head;

a write processing unit which selects shingled magnetic recording of overwriting data to the plurality of tracks in an overwrite direction parallel to a radial direction of the disk and which urges the write head to execute writing data to each of the bands; and an adjustment unit, wherein when the write processing unit urges the write head to execute writing the data to the first band, the adjustment unit arranges one or more unused sectors among a plurality of unused sectors, in the tracks other than a last track where the data is last written, and the plurality of data sectors of the first band include a plurality of recording sectors where valid data is written, and the plurality of unused sectors that are data sectors other than the plurality of recording sectors and where the valid data is not written.

2. The magnetic disk device of claim 1, wherein when writing data to the first band is executed, the adjustment unit intermittently arranges in a write direction, sequentially, a first unused area including one or more unused sectors among the plurality of unused sectors, a second unused area including one or more other unused sectors among the plurality of unused sectors, and a third unused area including one or more other unused sectors among the plurality of unused sectors, the write direction is a direction in which data is written sequentially to the plurality of recording sectors of the first band, and the number of a plurality of recording sectors belonging to a first recording area between the first unused area and the second unused area in the write direction is the same as the number of the plurality of recording sectors belonging to a second recording area between the second unused area and the third unused area in the write direction.

3. The magnetic disk device of claim 2, wherein the number of the one or more unused sectors belonging to the first unused area, the number of the one or more unused sectors belonging to the second unused area, and the number of the one or more unused sectors belonging to the third unused area are the same.

4. The magnetic disk device of claim 2, wherein the number of the one or more unused sectors belonging to the second unused area is more than or equal to the number of the one or more unused sectors belonging to the first unused area, and the number of the one or more unused sectors belonging to the third unused area is more than or equal to the number of the one or more unused sectors belonging to the second unused area.

5. The magnetic disk device of claim 1, further comprising:

a housing accommodating the disk and the write head; and a sensor accommodated in the housing and capable of detecting temperature information, wherein when writing data to the first band is executed, the adjustment unit derives a temperature of the write head based on the temperature information, and adjusts arrangement of the plurality of unused sectors based on the temperature of the write head.

6. The magnetic disk device of claim 5, wherein the plurality of tracks of the first band includes a first track where data is first written, the first track includes a first recording sector where data is first written, when writing data to the first band is executed, the adjustment unit first arranges a first unused area including one or more unused sectors among the plurality of unused sectors, in the first band, the adjustment unit arranges the first unused area at a first position when deriving a first temperature of the write head, and arranges the first unused area at a second position when deriving a second temperature of the write head, the first temperature is lower than a reference temperature, the second temperature is higher than the first temperature and lower than the reference temperature, the second position is located on the first recording sector side relative to the first position in a write direction, and the write direction is a direction in which data is written sequentially to the plurality of recording sectors of the first band.

7. The magnetic disk device of claim 1, wherein the first band includes a central area which is an area in a center of the overwrite direction, and when writing data to the first band is executed, the adjustment unit arranges a first unused area including one or more unused sectors among the plurality of unused sectors, in a track belonging to the central area, among the plurality of tracks of the first band.

8. The magnetic disk device of claim 1, wherein the plurality of data sectors of the first band include a defective sector, and when writing data to the first band is executed, the adjustment unit arranges one of the plurality of unused sectors as the defective sector.

9. The magnetic disk device of claim 1, wherein if the number of the plurality of data sectors of each of the tracks of the first band is denoted by n, when writing data to the first band is executed, the adjustment unit arranges ten or more, and less than n unused sectors in the tracks other than the last track.

10. The magnetic disk device of claim 1, wherein the plurality of tracks of the first band includes a first track where data is first written, the first band includes a first area to which the first track belongs, and a second area to which the last track belongs, when writing data to the first area of the first band is executed, the adjustment unit arranges a plurality of recording sectors in the first area in a first pattern, and when writing data to the second area of the first band is executed with a time interval from writing the data to the first area, the adjustment unit arranges a plurality of recording sectors in the second area in a second pattern different from the first pattern.

11. A write processing method applied to a magnetic disk device comprising a disk having a plurality of bands each including a plurality of tracks in a recording layer, the plurality of bands including a first band, each of the tracks including a plurality of data sectors, a write head writing data to the recording layer, the write head being a heat assisted magnetic recording head, a write processing unit which selects shingled magnetic recording of overwriting data to the plurality of tracks in an overwrite direction parallel to a radial direction of the disk and which urges the write head to execute writing data to each of the bands, and an adjustment unit, the method comprising:

when the write processing unit urges the write head to execute writing the data to the first band, arranging one or more unused sectors among a plurality of unused sectors, in the tracks other than a last track where the data is last written, wherein the plurality of data sectors of the first band include a plurality of recording sectors where valid data is written, and the plurality of unused sectors that are data sectors other than the plurality of recording sectors and where the valid data is not written.

12. The write processing method of claim 11, wherein when writing data to the first band is executed, a first unused area including one or more unused sectors among the plurality of unused sectors, a second unused area including one or more other unused sectors among the plurality of unused sectors, and a third unused area including one or more other unused sectors among the plurality of unused sectors, are intermittently arranged in a write direction, sequentially, the write direction is a direction in which data is written sequentially to the plurality of recording sectors of the first band, and the number of a plurality of recording sectors belonging to a first recording area between the first unused area and the second unused area in the write direction is the same as the number of the plurality of recording sectors belonging to a second recording area between the second unused area and the third unused area in the write direction.

13. The write processing method of claim 12, wherein the number of the one or more unused sectors belonging to the first unused area, the number of the one or more unused sectors belonging to the second unused area, and the number of the one or more unused sectors belonging to the third unused area are the same.

14. The write processing method of claim 12, wherein the number of the one or more unused sectors belonging to the second unused area is more than or equal to the number of the one or more unused sectors belonging to the first unused area, and the number of the one or more unused sectors belonging to the third unused area is more than or equal to the number of the one or more unused sectors belonging to the second unused area.

15. The write processing method of claim 11, applied to the magnetic disk device which further comprises a housing accommodating the disk and the write head and a sensor accommodated in the housing and capable of detecting temperature information, wherein when writing data to the first band is executed, a temperature of the write head is derived based on the temperature information, and arrangement of the plurality of unused sectors is adjusted based on the temperature of the write head.

16. The write processing method of claim 15, wherein the plurality of tracks of the first band includes a first track where data is first written, the first track includes a first recording sector where data is first written, a first unused area including one or more unused sectors among the plurality of unused sectors is first arranged in the first band when writing data to the first band is executed, the first unused area is arranged at a first position when deriving a first temperature of the write head, and the first unused area is arranged at a second position when deriving a second temperature of the write head, the first temperature is lower than a reference temperature, the second temperature is higher than the first temperature and lower than the reference temperature, the second position is located on the first recording sector side relative to the first position in a write direction, and the write direction is a direction in which data is written sequentially to the plurality of recording sectors of the first band.

17. The write processing method of claim 11, wherein the first band includes a central area which is an area in a center of the overwrite direction, and when writing data to the first band is executed, a first unused area including one or more unused sectors among the plurality of unused sectors is arranged in a track belonging to the central area, among the plurality of tracks of the first band.

18. The write processing method of claim 11, wherein the plurality of data sectors of the first band include a defective sector, and when writing data to the first band is executed, one of the plurality of unused sectors is arranged as the defective sector.

19. The write processing method of claim 11, wherein when writing data to the first band is executed, ten or more, and less than n unused sectors are arranged in tracks other than the last track, and the n is the number of the plurality of data sectors in each of the tracks of the first band.

20. The write processing method of claim 11, wherein the plurality of tracks of the first band includes a first track where data is first written, the first band includes a first area to which the first track belongs, and a second area to which the last track belongs, when writing data to the first area of the first band is executed, a plurality of recording sectors are arranged in the first area in a first pattern, and when writing data to the second area of the first band is executed with a time interval from writing the data to the first area, a plurality of recording sectors are arranged in the second area in a second pattern different from the first pattern.

* * * * *